(12) United States Patent
Kasaoki

(10) Patent No.: US 9,117,115 B2
(45) Date of Patent: Aug. 25, 2015

(54) EXTERIOR ENVIRONMENT RECOGNITION DEVICE AND EXTERIOR ENVIRONMENT RECOGNITION METHOD

(71) Applicant: Fuji Jukogyo Kabushiki Kaisha, Tokyo (JP)

(72) Inventor: Seisuke Kasaoki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 13/680,797

(22) Filed: Nov. 19, 2012

(65) Prior Publication Data
US 2013/0177205 A1 Jul. 11, 2013

(30) Foreign Application Priority Data
Nov. 24, 2011 (JP) ................................. 2011-256427

(51) Int. Cl.
G06K 9/00 (2006.01)
G06K 9/36 (2006.01)
B60Q 1/00 (2006.01)

(52) U.S. Cl.
CPC ........ G06K 9/00369 (2013.01); G06K 9/00362 (2013.01); G06K 9/00805 (2013.01)

(58) Field of Classification Search
None
See application file for complete search history.

(56) References Cited

U.S. PATENT DOCUMENTS

| 7,233,233 B2* | 6/2007 | Taniguchi et al. | 340/435 |
| 7,702,019 B2* | 4/2010 | Iwasaki et al. | 375/240.16 |
| 8,306,263 B2* | 11/2012 | Nagaoka et al. | 382/103 |
| 8,648,912 B2* | 2/2014 | Matsuda et al. | 348/148 |
| 2010/0052885 A1* | 3/2010 | Hanqvist | 340/436 |
| 2013/0010112 A1* | 1/2013 | Goto et al. | 348/148 |

FOREIGN PATENT DOCUMENTS

| JP | 3349060 | 9/2002 |
| JP | 2009-157581 A | 7/2009 |

OTHER PUBLICATIONS

Broggi et al., "Pedestrian Detection on a Moving Vehicle: an Investigation about Near Infra-Red Images", 2006 IEEE Intelligent Vehicles Symposium, pp. 431-436.*

* cited by examiner

*Primary Examiner* — Matthew Bella
*Assistant Examiner* — Jose M Torres
(74) *Attorney, Agent, or Firm* — McDermott Will & Emery LLP

(57) ABSTRACT

There are provided an environment recognition device and an environment recognition method. An exterior environment recognition device obtains an image in a detection area, generates a block group by grouping, based on a first relative relationship between blocks, multiple blocks in an area extending from a plane corresponding to a road surface to a predetermined height in the obtained image, divides the block group into two in a horizontal direction of the image, and determines, based on a second relative relationship between two divided block groups, whether the block group is a first person candidate which is a candidate of a person.

9 Claims, 17 Drawing Sheets

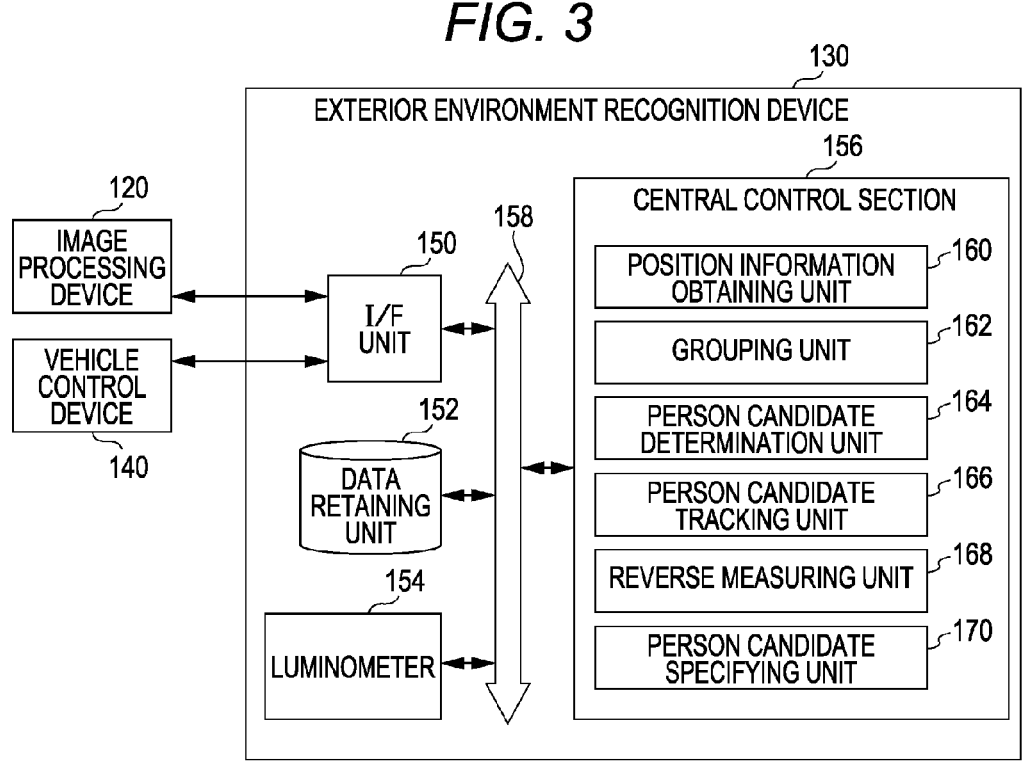
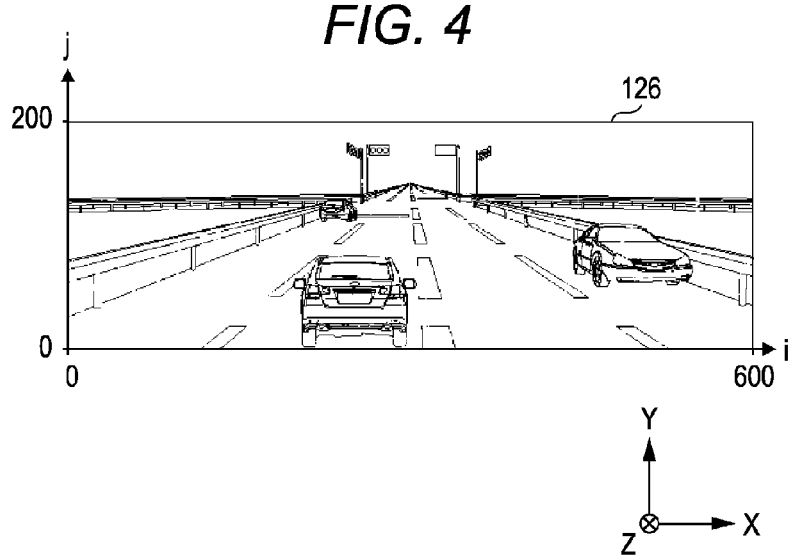

EMISSION RANGE

FIG. 19A
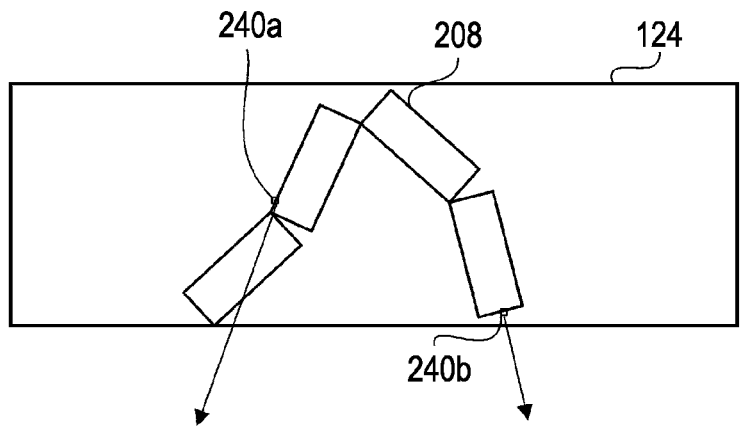
FIG. 19B     FIG. 19C
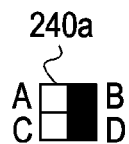     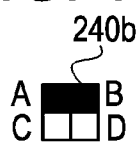
FIG. 19D     FIG. 19E
     
     
FIG. 19F     FIG. 19G
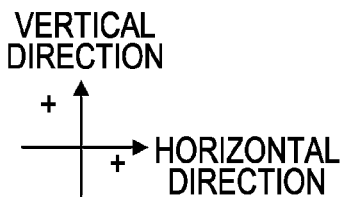     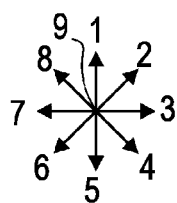

EXTERIOR ENVIRONMENT RECOGNITION DEVICE AND EXTERIOR ENVIRONMENT RECOGNITION METHOD

CROSS-REFERENCE TO RELATED APPLICATIONS

The present application claims priority from Japanese Patent Application No. 2011-256427 filed on Nov. 24, 2011, the entire contents of which are hereby incorporated by reference.

BACKGROUND OF THE INVENTION

1. Field of the Invention

The present invention relates to an exterior environment recognition device and an exterior environment recognition method for recognizing environment outside of a subject vehicle.

2. Description of Related Art

Conventionally, a technique has been known that specifies a target object such as a vehicle, a person, and an obstacle located in front of a subject vehicle to avoid collision with the specified target object (brake control) and perform control so as to maintain a safe distance between the subject vehicle and the preceding vehicle (cruise control) (for example, Japanese Patent No. 3349060). In many of these techniques, a target object is tracked to update position information, and moving speed and the like of the preceding vehicle and the person is calculated. The result of this calculation is reflected in the brake control and the cruise control, for example.

Among these target objects, a person such as a pedestrian in particular is highly flexible in moving direction and moving speed as compared with a preceding vehicle, and moreover, the absolute volume of the person is small. For this reason, it is difficult to find the behavior of the person and track the person, and which makes it difficult to apply the technique to the brake control and the cruise control.

Accordingly, a technique has been known in which, in an image obtained by the subject vehicle, an area where movement is uniform is provisionally defined as an upper area, and a determination is made as to whether movements of feature points in a lower portion are not uniform. When the movements are determined to be non-uniform, the area is defined as a lower area, and a combination thereof is specified as a whole body area of a pedestrian (for example, Japanese Unexamined Patent Application (JP-A) No 2009-157581).

When the technique of Japanese Patent No. 3349060 is used, the whole body of a person can be specified in daylight. However, in a state where it is necessary to turn on headlights such as night, an effective image can be obtained only in a relatively low position of the whole body area of the pedestrian (the area of the lower half of the body) upon which lights of the headlights of the subject vehicle are incident, and it is impossible to specify an area where movements are uniform, which corresponds to the area of the upper half of the body. Therefore, for example, the whole body area of the pedestrian crossing in front of the subject vehicle cannot be specified, and this may cause problem in smooth operation of the brake control and the cruise control.

BRIEF SUMMARY OF THE INVENTION

The present invention is made in view of such problems, and it is an object of present invention to provide an exterior environment recognition device and an exterior environment recognition method capable of improving the efficiency for specifying a person and the accuracy for specifying a person by directly specifying the person with a lower portion area (the lower half of the body) of the person.

In order to solve the above problems, an aspect of the present invention provides an exterior environment recognition device including: an image obtaining unit for obtaining an image in a detection area; a grouping unit for generating a portion group by grouping, based on a first relative relationship between portions, multiple portions in an area extending from a plane corresponding to a road surface to a predetermined height in the obtained image; and a person candidate determination unit for dividing the portion group into two in a horizontal direction of the image, and determines, based on a second relative relationship between two divided portion groups, whether the portion group is a first person candidate which is a candidate of a person.

Preferably, the first relative relationship is any one of a relative position relationship, a difference of luminance, or continuity in an edge direction.

Preferably, the second relative relationship is one or more relationships selected from a group including a shape, a size of area, symmetry, and luminance.

Preferably, the second relative relationship is whether or not each central line angle formed by a vertical line and a central line of each of the two divided portion groups is included in a predetermined first angle range.

Preferably, the grouping unit further divides, into multiple areas in a height direction, the area extending from the plane corresponding to the road surface to the predetermined height in the image, and groups multiple portions in each of the areas divided, and the person candidate determination unit determines the first person candidate when the second relative relationship between the two divided portion groups is satisfied and a difference angle between central lines of the grouped portion groups adjacent to each other in the height direction is within a predetermined second angle range.

Preferably, when a difference angle formed by any one of the areas in the height direction is determined not to be included in the predetermined second angle range, the person candidate determination unit does not execute determination of the first person candidate concerning the remaining areas.

Preferably, the person candidate determination unit changes the first angle range according to a distance between a subject vehicle and the portion group.

Preferably, the exterior environment recognition device includes: a person candidate tracking unit for tracking the portion group determined to be the first person candidate by the person candidate determination unit; a reverse measuring unit for measuring a number of times of reverses when the person candidate determination unit determines that the portion group tracked by the person candidate tracking unit is the first person candidate and is not the first person candidate; and a person candidate specifying unit for specifying the first person candidate as a second person candidate when the number of times of reverses is determined to be included in the predetermined range of the number of times.

Preferably, the exterior environment recognition device includes: a person candidate tracking unit for tracking the portion group determined to be the first person candidate by the person candidate determination unit; a reverse measuring unit for measuring a reverse cycle when the person candidate determination unit determines that the portion group tracked by the person candidate tracking unit is the first person candidate and is not the first person candidate; and a person candidate specifying unit for determining the first person candidate is moving when a reverse cycle is determined to be included in a predetermined cycle range.

A second aspect of the present invention provides an exterior environment recognition method including the steps of: obtaining an image in a detection area; generating a portion group by grouping, based on a first relative relationship between portions, multiple portions in an area extending from a plane corresponding to a road surface to a predetermined height in the obtained image; dividing the portion group into two in a horizontal direction of the image; and determining, based on a second relative relationship between two divided portion groups, whether the portion group is a first person candidate which is a candidate of a person.

BRIEF DESCRIPTION OF THE SEVERAL VIEWS OF THE DRAWINGS

FIG. 3 is a functional block diagram schematically illustrating functions of an exterior environment recognition device;

FIG. 4 is an explanatory diagram for explaining conversion into three-dimensional position information performed by a position information obtaining unit;

FIGS. 19A-19G are explanatory diagrams for explaining continuity in an edge direction;

DETAILED DESCRIPTION OF THE INVENTION

Figure 1:
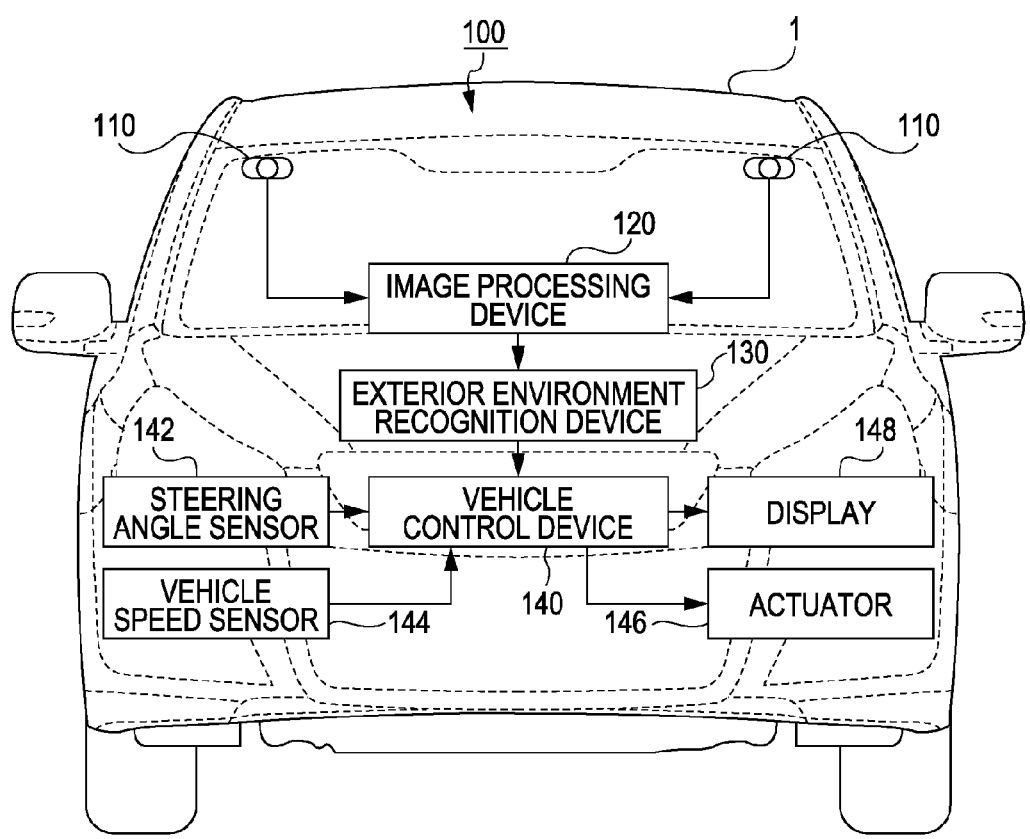
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of imaging devices 110 (two imaging devices 110 in the present embodiment), an image processing device 120, an exterior environment recognition device 130, and a vehicle control device 140 that are provided in a vehicle 1.

The imaging devices 110 include an imaging element such as a CCD (Charge-Coupled Device) and a CMOS (Complementary Metal-Oxide Semiconductor), and can obtain a color image, that is, luminances of three color phases R (red), G (green), B (blue) per pixel. In this case, a color image captured by the imaging devices 110 is referred to as luminance image and is distinguished from a distance image to be explained later.

The imaging devices 110 are disposed to be spaced apart from each other in a substantially horizontal direction so that optical axes of the two imaging devices 110 are substantially parallel in a proceeding direction of the vehicle 1. The imaging device 110 continuously generates image data obtained by capturing an image of a specific object existing in a detection area in front of the vehicle 1 at every 1/60 seconds (60 fps), for example. In this case, the specific object may be not only an independent three-dimensional object such as a person (human), a vehicle, a traffic light, a road, and a guardrail, but also an illuminating portion such as a brake lamp (tail lamp), a turn signal, a traffic light that can be specified as a portion of a three-dimensional object. Each later-described functional unit in the embodiment performs processing in response to the update of such image data.

The image processing device 120 obtains image data from each of the two imaging devices 110, and derives, based on the two pieces of image data, parallax information including a parallax of any block (a set of a predetermined number of pixels) in the image as a portion and a position representing a position of the any block in the image. The image processing device 120 derives a parallax using so-called pattern matching that searches a block in one of the image data corresponding to the block optionally extracted from the other image data. In this embodiment, the horizontal direction used for explaining the block means a horizontal direction for the captured image, and corresponds to the width direction in the real world. On the other hand, the "vertical" direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block includes 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative distance) with image data is referred to as a distance image.

Figure 2A:
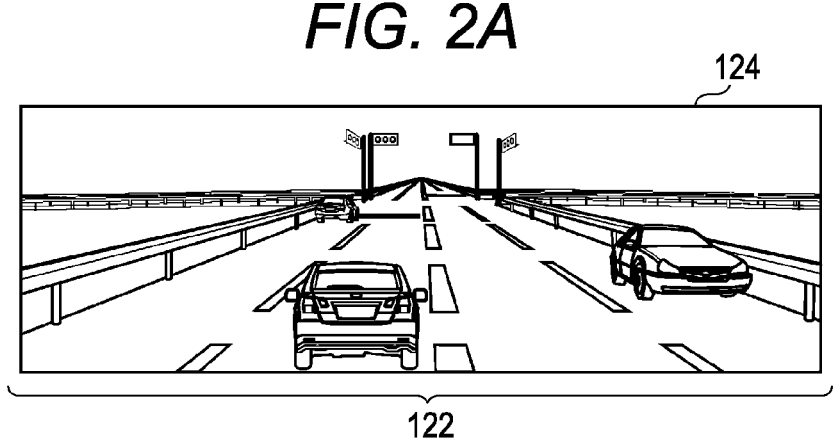
FIGS. 2A and 2B are explanatory diagrams for explaining a luminance image.
Figure 2B:
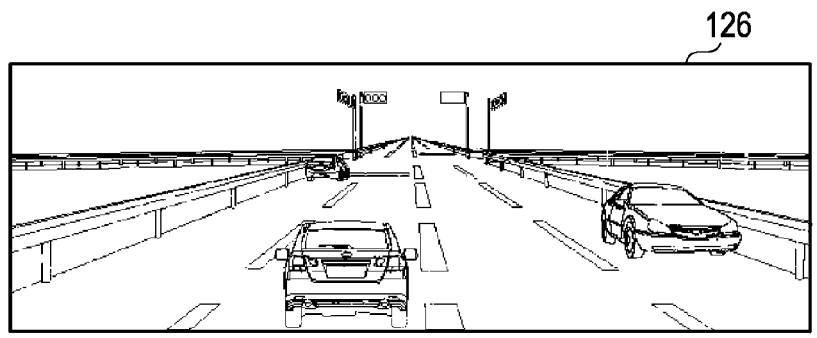

FIGS. 2A and 2B are explanatory diagrams for explaining a luminance image 124 and a distance image 126. For example, assume that the luminance image (image data) 124 as shown in FIG. 2A is generated with regard to a detection area 122 by the two imaging devices 110. Here, for the sake of easy understanding, only one of the two luminance images 124 is schematically shown. The image processing device 120 obtains a parallax for each block from such luminance image 124, and forms the distance image 126 as shown in FIG. 2B. Each block of the distance image 126 is associated with a parallax of the block. In the drawing, for the sake of explanation, a block of from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The exterior environment recognition device 130 obtains the luminance image 124 and the distance image 126 from the image processing device 120, and uses the luminance based on the luminance image 124 and the relative distance from the subject vehicle derived from the distance image 126 to determine which specific object the target object in the detection area 122 corresponds to. For example, by specifying a pedestrian (specific object) crossing in front of the subject vehicle, the existence and the behavior of the pedestrian can be found quickly, and this can be reflected in the brake control and the cruise control.

It should be noted that the above relative distance can be obtained by converting parallax information for each block in the distance image 126 into three-dimensional position information using a so-called stereo method. The stereo method is a method using a triangulation method to derive a relative distance of a target object with respect to the imaging device 110 from the parallax of the target object. Processing performed by the exterior environment recognition device 130 will be explained later in detail.

The vehicle control device 140 avoids a collision with the target object specified by the exterior environment recognition device 130 and performs control so as to maintain a safe distance from the preceding vehicle. More specifically, the vehicle control device 140 obtains a current cruising state of the vehicle 1 based on, for example, a steering angle sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Exterior Environment Recognition Device 130)

FIG. 3 is a functional block diagram schematically illustrating functions of the exterior environment recognition device 130. As shown in FIG. 3, the exterior environment recognition device 130 includes an I/F unit 150, a data retaining unit 152, a luminometer 154, and a central control unit 156.

The I/F unit 150 is an interface for interactive information exchange with the image processing device 120 and the vehicle control device 140. The I/F unit 150 functions as an image obtaining unit. The data retaining unit 152 is constituted by a RAM, a flash memory, an HDD and the like, and retains various kinds of information required for processing performed by each functional unit explained below. In addition, the data retaining unit 152 temporarily retains the luminance image 124 and the distance image 126 received from the image processing device 120. The luminometer 154 measures illumination intensity outside of the vehicle to check the exterior environment.

The central control unit 156 is comprised of a semiconductor integrated circuit including, for example, a central processing unit (CPU), a ROM storing a program and the like, and a RAM serving as a work area, and controls the I/F unit 150, the data retaining unit 152, and the luminometer 154 through a system bus 158. In the present embodiment, the central control unit 156 also functions as a position information obtaining unit 160, a grouping unit 162, a person candidate determination unit 164, a person candidate tracking unit 166, a reverse measuring unit 168, and a person candidate specifying unit 170. With each functional unit of the central control unit 156 explained above, the exterior environment recognition device 130 specifies a target object in the detection area as a specific object. Representing examples of specific objects include a preceding vehicle and a person (pedestrian). In this explanation about the present embodiment, for example, a person located in front of a vehicle 1 is specified in a situation where it is necessary to turn on headlights such as nighttime (for the sake of explanation, this will be simply referred to as "nighttime").

The position information obtaining unit 160 uses the stereo method to convert parallax information for each block in the detection area 122 of the distance image 126 into three-dimensional position information including the width direction x, the height direction y, and the depth direction z. The parallax information represents a parallax of each block in the distance image 126, whereas the three-dimensional position information represents information about the relative distance of each block in the real world. When the parallax information is not derived by the pixel but is derived by the block, that is, a calculation may be executed in units of pixels with the parallax information being deemed as parallax information about all the pixels which belong to a block.

FIG. 4 is an explanatory diagram for explaining conversion into three-dimensional position information performed by the position information obtaining unit 160. First, the position information obtaining unit 160 treats the distance image 126 as a coordinate system in a pixel unit as shown in FIG. 4. In FIG. 4, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two imaging devices 110 is denoted as an origin (0, 0, 0). When the road is assumed to be a flat plane, the road surface matches the X-Z plane (y=0). The position information obtaining unit 160 uses (formula 1) to (formula 3) shown below to transform the coordinate of the block (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the imaging devices 110, PW denotes a corresponding distance in the real world to a distance between adjacent pixels in the image, so-called like an angle of view per pixel, CH denotes an disposed height of the imaging device 110 from the road surface, IV and JV denote coordinates (pixels) in the image at an infinity point in front of the vehicle 1, and KS denotes a distance coefficient (KS=CD/PW).

Accordingly, the position information obtaining unit 160 derives the height from the road surface on the basis of the detection distance (for example, the number of pixels) in the distance image 126 between a point on the road surface located at the same relative distance as the block and the block. It should be noted that an X-Z plane corresponding to the road surface (y=0) can be derived based on a three-dimensional coordinate of a traffic lane on the road (a line dividing the road), and the traffic lane can be extracted from luminance change with respect to the road. The three-dimensional position of the road surface can be derived using various kinds of available techniques, and therefore, detailed description thereabout is omitted here.

The grouping unit 162 groups multiple blocks in the distance image 126 on the basis of relative position relationship, serving as a first relative relationship, derived by the position information obtaining unit 160, and generates a block group serving as a portion group. For example, the grouping unit 162 performs grouping process in such a manner that any given block is adopted as a base point, and a block adjacent to that block is retrieved, and a block of which difference in a width direction x from that of the block serving as the base point, of which difference in a height direction y therefrom, and of which difference in a depth direction z therefrom are within a predetermined range (for example, 0.5 m) is considered to correspond to same target object. The range is represented as a distance in the real world, and can be set at any given value by a manufacturer and a driver.

The grouping unit 162 also groups blocks which are newly added by grouping process, such that the grouping unit 162 further groups blocks of which difference in the width direction x from the block serving as the base point, of which difference in the height direction y from the block serving as the base point, and of which difference in the depth direction z from the block serving as the base point are within a predetermined range. As a result, all the blocks that can be provisionally determined to be the same specific object are grouped.

In the above description, each of the difference in the width direction x, the difference in the height direction y and the difference in the depth direction z is independently determined, and only when all of them are included within the predetermined range, the target portions are grouped into a the same group. However, grouping processing may be performed using another calculation. For example, when Euclidean distance, square root of ((difference in the width distance x)2+(difference in the height direction y)2+(difference in the depth direction z)2), is included within a predetermined range, target portions may be grouped into the same group. With such calculation, distances between blocks in the real world can be derived accurately, and therefore, grouping accuracy can be enhanced.

In this case, three parameters, i.e., the difference in the width direction x, the difference in the height direction y, and the difference in the depth direction z, are used, but the embodiment is not limited thereto. Alternatively, the grouping process may be performed using only two of the differences such as the difference in the width direction x and the difference in the height direction y, the difference in the width direction x and the difference in the depth direction z, or the difference in the height direction y and the difference in the depth direction z. Further, in a certain specific object, overall luminance is similar, and the tendency of change of the luminance is in a regular pattern, and therefore, the grouping unit 162 may make use of the luminance characteristics, and may perform the grouping process additionally using a condition that the luminance is close.

In the present embodiment, when the exterior environment is determined to be nighttime using the luminometer 154 or when the headlights are determined to be ON state, the grouping unit 162 limits the detection target to a portion of the detection area 122. More specifically, the grouping unit 162 limits the area to an area extending from the plane corresponding to the road surface to a predetermined height (for example, 1.0 m), and groups blocks existing only in that area.

Figure 5A:
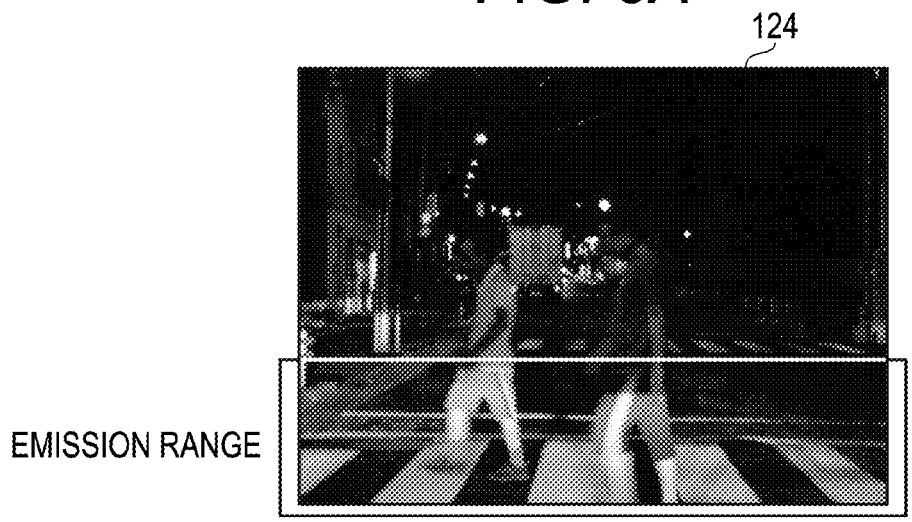
FIGS. 5A and 5B are explanatory diagrams for explaining area limitation by a grouping unit.
Figure 5B:
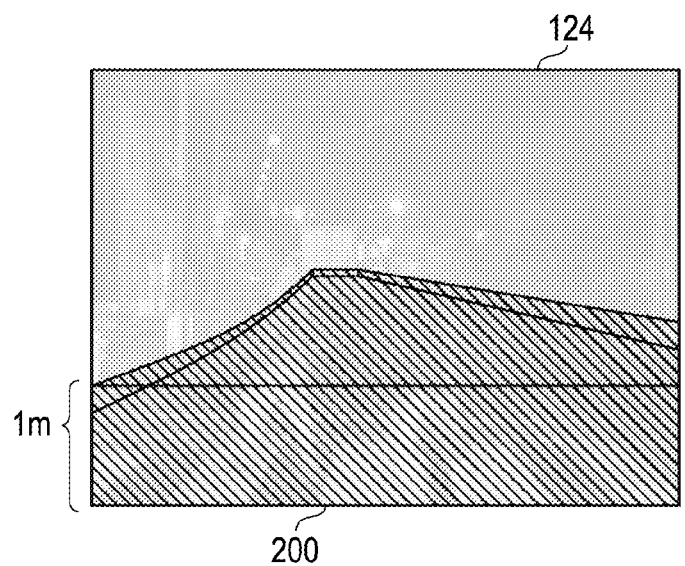

FIGS. 5A and 5B are explanatory diagrams for explaining area limitation by the grouping unit 162. For the sake of convenience of explanation, the luminance image 124 is used for explanation. The present embodiment is made mainly for the purpose of specifying a person located in front of the vehicle 1 at night. In this case, the vehicle 1 illuminates the road ahead using the headlights, but with a low beam which is used in an ordinary state, the light is cast upon the legs of a person as shown in a range enclosed by a rectangle in FIG. 5A. Therefore, in a luminance image 124 obtained at night, a target object of a height almost equivalent to the legs of a person is mainly shown, and accordingly, relative distances in the depth direction z are derived with regard to blocks which are lower than the height of the legs of the person in the distance image 126. In order to cope with such nighttime, the grouping unit 162 groups blocks only in a limited area 200 which is in a three-dimensional belt shape within one meter and which is above the road surface, as indicated by diagonal lines in FIG. 5B.

As described above, at night, the detection target is limited to the range of one meter from the road surface, so that this can prevent false detection, e.g., falsely detecting a target object located at one meter or higher from the road surface, and the legs of the person can be reliably detected. Moreover, as compared with the processing in which the entire detection area 122 is adopted as a target, the load of the processing can be significantly reduced.

In addition to the area extending from the plane corresponding to the road surface to the predetermined height (for example, 1.0 m), the grouping unit 162 may exclude an area outside of a side strip or a guardrail as shown in FIG. 5B. In this manner, the load can be further reduced.

In this case, for example, nighttime is determined in accordance with a measurement result provided by the luminometer 154 and the illumination state of the headlights, and the detection target is limited to the range of one meter from the road surface. However, when the exterior environment is bright, for example, in daylight, the detection target may be the entire detection area 122, so that the whole body of the person including not only the lower half of the body but also the upper half of the body may be subjected to the grouping process.

The person candidate determination unit 164 divides, in the horizontal direction of the image, some of block groups grouped by the grouping unit 162 which can be determined to be legs of a person and of which size of area is equal to or more than a certain size of area, and on the basis of a second relationship between the block groups into two, the person candidate determination unit 164 determines whether or not a block groups are a first person candidate or not. Various kinds of relationships can be used as the second relationship. In this case, overall inclination of each of the two divided block groups is used as a typical example. More specifically, the person candidate determination unit 164 determines, as the second relationship, whether each central line angle which is an angle between a vertical line and a central line of each of the two divided block groups is included in a predetermined first angle range (for example, within 30±15 degrees). It should be noted that the first person candidate represents likelihood (level) of a person candidate, which is distinguished from the second person candidate explained later.

Figure 6A:
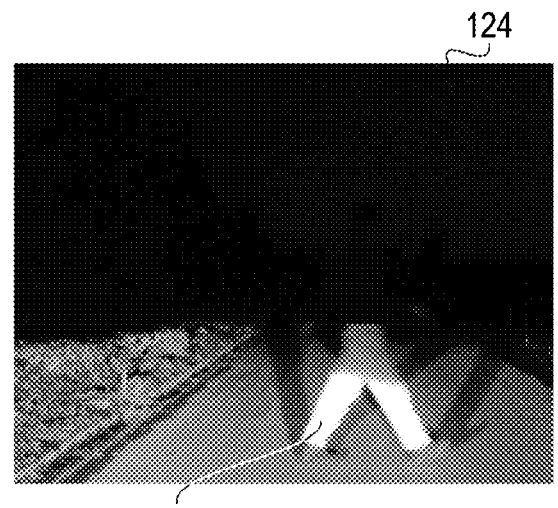
FIGS. 6A, 6B, and 6C are explanatory diagrams for explaining processing of a person candidate determination unit.
Figure 6B:
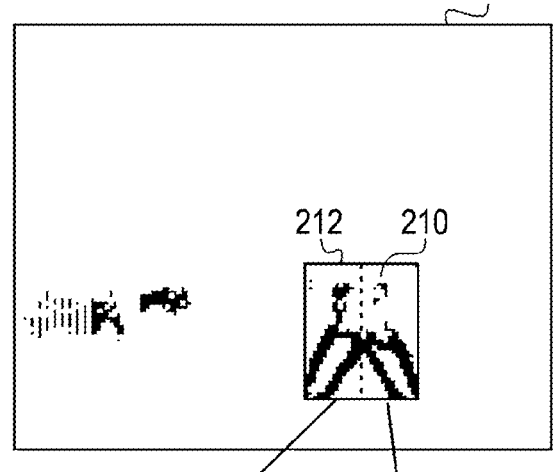
Figure 6C:
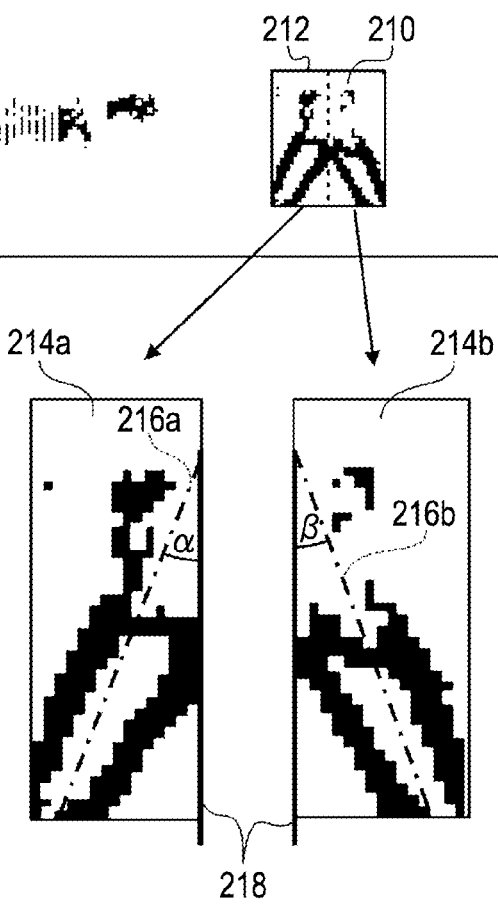

FIGS. 6A-6C are explanatory diagrams for explaining processing of the person candidate determination unit 164. In the vehicle 1 runs at night, suppose that a luminance image 124 as shown in FIG. 6A is obtained from the image processing device 120. As can be understood from FIG. 6A, an effective image of a person 208 is a portion below the hip. At this occasion, the grouping unit 162 extracts a block group 210 by grouping multiple blocks of which relative positions are close, in the area extending from the plane corresponding to the road surface to the predetermined height (for example, 1.0 m) in the distance image 126 of FIG. 6B based on the luminance image 124 of FIG. 6A. The person candidate determination unit 164 generates a virtual frame 212 by enclosing the external edge of the block group 210 with a rectangle extending in horizontal and vertical directions. Then, the frame 212 is divided into two in the horizontal direction, and partial block groups 214a, 214b are generated as shown in FIG. 6C.

Subsequently, the person candidate determination unit 164 refers to all the blocks of each of the partial block group 214a and partial block group 214b of FIG. 6C, and using the least squares method, the person candidate determination unit 164 generates central lines 216a, 216b as indicated by alternate long and short dashed lines. Since a method for obtaining an approximate straight line (curve) by the least squares method is a technique already known, detailed explanation thereabout is omitted here. In the above explanation, one-dimensional model is used as the central lines 216a, 216b, but curved lines of two or more degrees may also be used.

The person candidate determination unit 164 determines whether or not each of central line angles α, β, which are angles between the generated central lines 216a, 216b and a vertical line 218 extended in the vertical direction in the image (vertical direction), is included within a predetermined first angle range (for example, 30±15 degrees). When both of the central line angles α, β are included in the first angle range, the person candidate determination unit 164 deems that the partial block groups 214a, 214b are two legs of the person, and adopts the block group 210 as the first person candidate.

The first angle range used here may be fixed to a predetermined angle as described above, but may be changed in accordance with the distance between the vehicle 1 and the block group 210. The images retrieved into the exterior environment recognition device 130 as the luminance image 124 and the distance image 126 are expressed with pixels of the same size regardless of the three-dimensional coordinates. In other words, a block group 210 close to the vehicle 1 (short distance) can be expressed in more detail since the size of area thereof is larger as compared with the pixel, but a block group 210 far from the vehicle 1 (long distance) becomes rough since the size of area is smaller as compared with the pixel. Accordingly, the resolution of the block group 210 at a distance is degraded, and it may be impossible to correctly detect the central line angles between the central lines 216a, 216b and the vertical line 218.

Therefore, in accordance with relative distance from the vehicle 1 in the depth direction z, the person candidate determination unit 164 reduces (applies stricter condition to) the first angle range corresponding to the block group 210 located at a distance as compared with the first angle range corresponding to the block group 210 located in proximity, thus avoiding falsely detecting the block group 210 at a distance as the legs of the person. This makes it difficult to detect a person even when a person actually exists at a distance, but the environment recognition system 100 is hardly affected by such person located far away, and therefore, this does not cause any problem.

In this manner, the person candidate determination unit 164 can deem the block group 210 grouped by the grouping unit 162 as the first person candidate. However, when the first person candidate is extracted based on only the central lines 216a, 216b of the entire block groups 210 divided into two (partial block group 214a, 214b), a specific object that is different from a person may be incorrectly deemed as the first person candidate.

Figure 7:
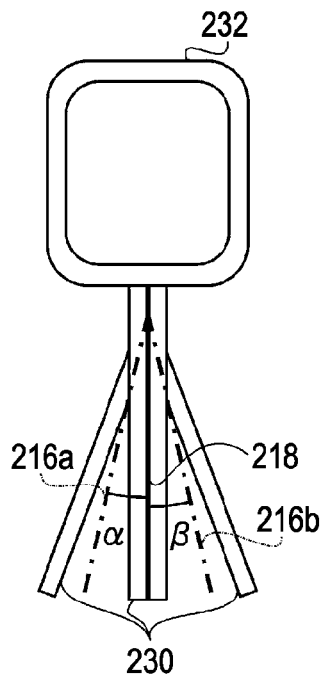
FIG. 7 is an explanatory diagram for explaining processing of the person candidate determination unit.

FIG. 7 is an explanatory diagram for explaining processing of the person candidate determination unit 164. Suppose a signage 232 supported by a plurality of struts 230 as shown in FIG. 7. In this case, when the central line angles α, β between the central lines 216a, 216b of the multiple struts 230 and the vertical line 218 are included within the first angle range (for example, 30±15 degrees), the person candidate determination unit 164 may determine that such struts 230 are the first person candidate. Accordingly, in the present embodiment, even when the person candidate determination unit 164 once determines the first person candidate, the block group is subdivided, and the first person candidate is specified again with a higher degree of likelihood of the first person candidate.

More specifically, the grouping unit 162 further divides the area extending from the plane corresponding to the road surface to the predetermined height in the image into multiple areas in the height direction, and groups the blocks in each divided area. Then, when a difference angle (bending of a joint) formed by central lines of the grouped block groups adjacent (continuous) in the height direction is included within a predetermined second angle range (for example, the absolute value is 5 degrees or more), the person candidate determination unit 164 formally determines that the block group 210 is the first person candidate.

Figure 8:
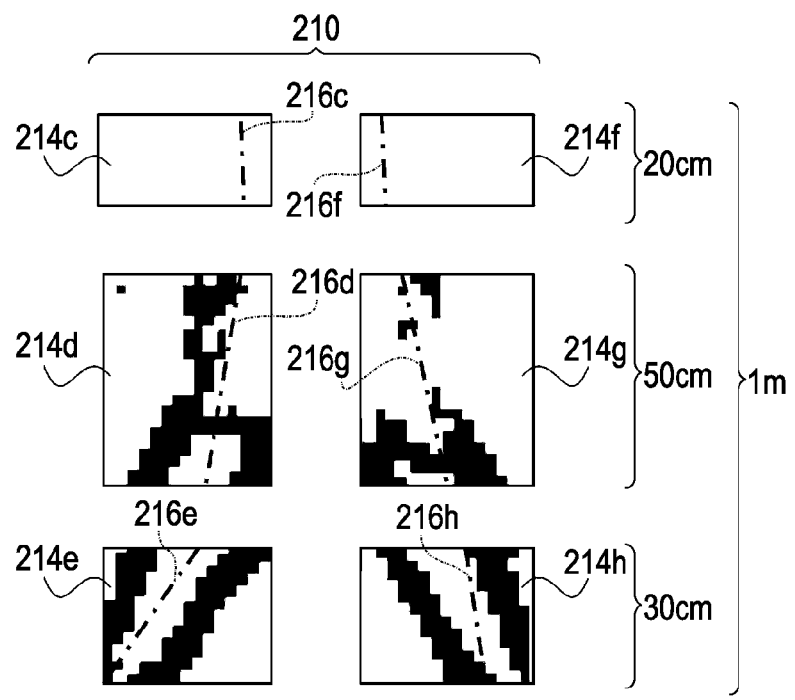
FIG. 8 is an explanatory diagram for explaining subdividing by the grouping unit.

FIG. 8 is an explanatory diagram for explaining subdividing by the grouping unit 162. For example, based on the distance image 126 as shown in FIG. 6B, the grouping unit 162 groups multiple blocks of which relative positions are close, in multiple areas obtained by further dividing the area extending from the plane corresponding to the road surface to the predetermined height (for example, 1.0 m), and extracts partial block groups 214c, 214d, 214e, 214f, 214g, 214h as shown in FIG. 8. At this occasion, the dividing ratios are, for example, 30 cm, 50 cm, 20 cm, which are in order from the road surface, with the entire area being 1 m. The dividing ratios are determined based on the assumption that the tips of the toes of the legs and the calf portion of the person are located on the road surface (30 cm), thighs are located thereabove in the vertical direction (50 cm), and the hip of located thereabove in the vertical direction (20 cm). Reference numerals 216c, 216d, 216e, 216f, 216g, and 216h in FIG. 8 indicate central lines of the partial block groups 214c, 214d, 214e, 214f, 214g, and 214h, respectively.

Subsequently, the person candidate determination unit 164 determines whether or not a difference angle formed by partial block groups adjacent to each other in the height direction, e.g., the central lines 216d, 216e of the partial block group 214d and the partial block group 214e, is included within the predetermined second angle range (for example, the absolute value is 5 degrees or more), and when included, the person candidate determination unit 164 determines it as the first person candidate again. As described above, when bending of a joint which can be found only in a person is taken into consideration, the strut 230 which is inclined but is represented as a simple straight line as shown in FIG. 7 can be excluded from the first person candidate, and this allows extraction of the first person candidate with a higher degree of accuracy.

In this case, the dividing ratios of 30 cm, 50 cm, 20 cm with the entire length being 1.0 m are set based on the relationship of legs and joints of a typical Japanese person, but the entire length and the dividing ratios may be set at any values. For example, they may be set differently according to country, region, or environment.

In the extraction processing of the first person candidate arranged with such dividing ratios, the person candidate determination unit 164 does not execute the determination of the first person candidate with regard to the remaining area unless the difference angle formed by any one of the areas in the height direction is included in the predetermined second angle range. This is because, when even a portion cannot be determined to be the first person candidate, there is no probability that the block group 210 in question is the first person candidate, and therefore, the subsequent processing is omitted. As described above, the load of the processing can be reduced.

At this occasion, the person candidate determination unit 164 may make the determination of the first person candidate from the upper side to the lower side in the vertical direction, i.e., the person candidate determination unit 164 may make determination of the calf and the thigh and then the thigh and the hip. This is because the difference angle between the calf and the thigh is usually more than the difference angle between the thigh and the hip, and the determination of the first person candidate can be made more accurately. First, the person candidate determination unit 164 derives the difference angle between the calf and the thigh, and when the value is not included in the second angle range, the difference angle between the thigh and the hip is not derived thereafter. Only when the difference angle between the calf and the thigh is included in the second angle range, the difference angle between the thigh and the hip is derived.

As described above, the first person candidate is determined only when multiple conditions are satisfied, so that although the block group 210 extracted as the first person candidate may be limited, this is more advantageous as compared with a case where block group 210 which should not be detected is falsely detected as the first person candidate. This is because, if the vehicle 1 decelerates frequently in the brake control and the cruise control against the driver's intention due to false detection, the comfort during driving may be lost. Therefore, in the present embodiment, only a sufficiently reliable block group 210 is extracted as the first person candidate.

The person candidate tracking unit 166 tracks the block group 210 extracted as the first person candidate by the person candidate determination unit 164, by means of image processing. Such tracking is executed, for example, as follows using images based on image data generated continuously every 1/60 seconds. The person candidate tracking unit 166 extracts a block group 210 of which tendency of luminance is similar to the block group 210 in the previous image, from a position and proximity thereto in the current image corresponding to the position of the block group 210 extracted as the first person candidate in the previous image. The similarity of the block groups 210 is determined by extracting a block determined to have correlation with the previous block in pattern matching from the current image for each block obtained by subdividing the block group 210 in the previous image. Various available techniques can be used for the tracking processing including this kind of similarity determination, and therefore, detailed description thereabout is omitted here.

The reverse measuring unit 168 measures the number of times of reverses and the reverse cycle when the person candidate determination unit 164 determines that the block group 210 tracked by the person candidate tracking unit 166 is the first person candidate, and is not the first person candidate.

A person moves forward by alternately moving right and left legs forward. Therefore, when a walking person is observed from a side, both legs are open, and then, both legs are closed, and then both legs are open again. More specifically, when a person walks, the following two states are repeated: a state in which both legs are open (a state which is determined to be the first candidate by the person candidate determination unit 164) and a closed state (a state which is determined not to be the first candidate by the person candidate determination unit 164). Accordingly, in the present embodiment, in view of the behavior of the block group 210 extracted by the person candidate determination unit 164 as the first person candidate, a determination is made as to whether the block group 210 is the second person candidate which is more likely to be a person, and a determination is made as to whether the first person candidate is moving or not. The first person candidate and the second person candidate are different in the likelihood of being a person, and both the first person candidate and the second person candidate are candidates of persons. In the control of later stage, they are used as necessary in accordance with the required degree of likelihood of being a person.

Figure 9:
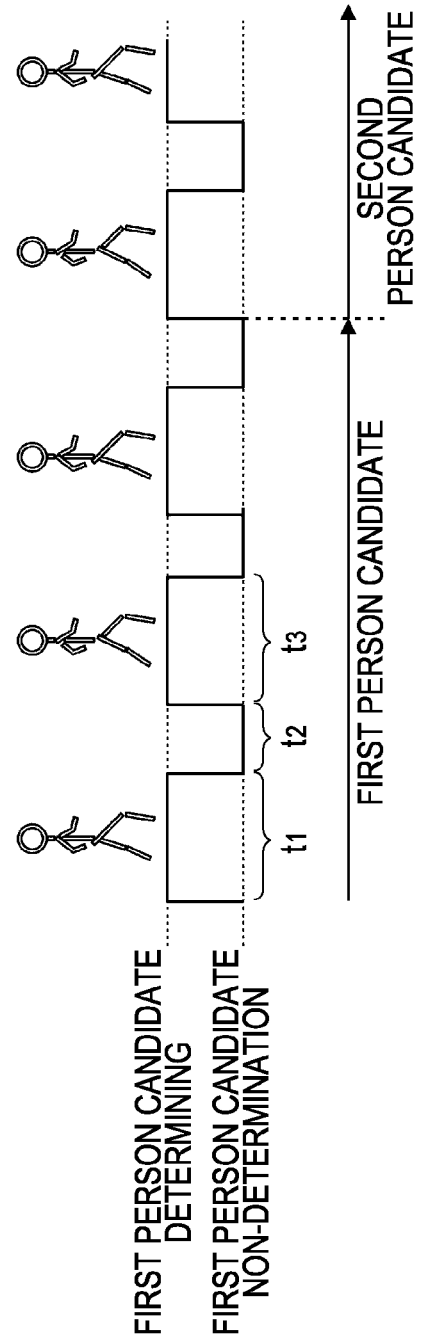
FIG. 9 is an explanatory diagram for explaining processing of a reverse measuring unit.

FIG. 9 is an explanatory diagram for explaining processing of the reverse measuring unit 168. While a person is walking, both of the central line angle of the right leg and the central line angle of the left leg are included in the first angle range in a period t1 in which, for example, the right leg at the front, and therefore, the person candidate determination unit 164 adopts the block group 210 as the first person candidate. However, in a period t2 in which the left leg is being moved forward and both legs overlap each other, the central line angles of both of the legs are temporality out of the first angle range. Then, in a period t3 at which the left leg is at the front, the central line angles of both of the legs are included in the first angle range again. As described above, the state in which the block group 210 tracked by the person candidate tracking unit 166 is determined to be the first person candidate by the person candidate determination unit 164 (first person candidate determination) and the state in which the block group 210 tracked by the person candidate tracking unit 166 is determined not to be the first person candidate by the person candidate determination unit 164 (first person candidate non-determination) are expressed in a timing chart as shown in FIG. 9, and this shows that the behavior thereof is periodical. The reverse measuring unit 168 measures the number of times of reverses and the reverse cycle of them.

The person candidate specifying unit 170 observes the number of times of reverses measured by the reverse measuring unit 168, and when the number of times of reverses is included within the predetermined range of the number of times (for example, four times or more), the person candidate specifying unit 170 changes the first person candidate to the second person candidate of which likelihood of being a person is higher than the first person candidate as shown by an arrow in FIG. 9.

In this manner, the exterior environment recognition device 130 can extract one or more block groups as second person candidates from the distance image 126, and the information can be used for various kinds of controls. For example, when any given block group in the detection area is determined to be a person (second person candidate), it is possible to avoid collision with the specified person, and it is possible to perform control so as to maintain a safe distance between the subject vehicle and the person.

When the reverse cycle measured by the reverse measuring unit 168 is determined to be included within a predetermined cycle range (for example, 0.5 Hz or more), the person candidate specifying unit 170 determines that the first person candidate is moving. When the reverse cycle measured by the reverse measuring unit 168 is determined not to be included within a predetermined cycle range (for example, less than 0.5 Hz), the person candidate specifying unit 170 determines that the first person candidate is at a stop.

In this manner, the exterior environment recognition device 130 can determine that the block group 210 extracted as the first person candidate or the second person candidate is moving, and this enables control to avoid collision with the determined person and to maintain a safe distance from the person.

(Exterior Environment Recognition Method)

Figure 10:
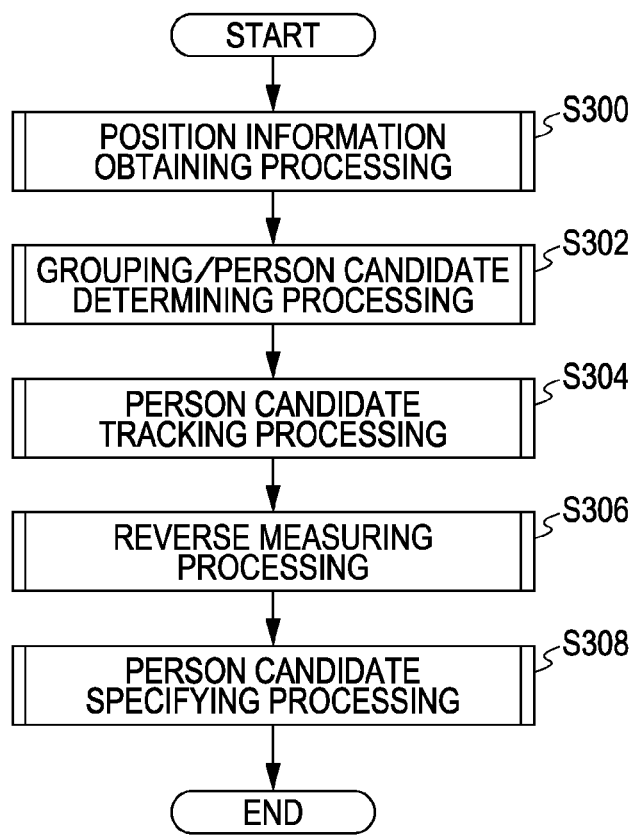
FIG. 10 is a flowchart illustrating overall flow of an exterior environment recognition method.

Hereinafter, specific processings performed by the exterior environment recognition device 130 will be explained with reference to the flowcharts of FIGS. 10 to 18. FIG. 10 illustrates overall flow of interrupt processing when the image processing device 120 transmits the distance image 126. FIGS. 11 to 18 illustrate individual subroutines therein. In this case, pixels or blocks are used as target portions of processing, and the lower left corners of the luminance image 124 and the distance image 126 are origins. With the blocks, the processing is carried out according to the exterior environment recognition method in a range of 1 to 150 blocks in the horizontal direction of the image and 1 to 50 blocks in the vertical direction of the image. In this case, cruise at night is considered in the explanation for the sake of explanation.

As shown in FIG. 10, when an interrupt occurs according to the environment recognition method in response to reception of the distance image 126, the distance image 126 obtained from the image processing device 120 is referred, and the position information obtaining unit 160 converts parallax information of each block within the detection area 122 of the distance image 126 into three-dimensional position information (S300). Then, the grouping unit 162 and the person candidate determination unit 164 groups multiple blocks in the area extending from the plane corresponding to the road surface to the predetermined height, and determines whether or not the grouped block groups are the first person candidate or not (S302).

Subsequently, the person candidate tracking unit 166 tracks all the block groups 210 extracted by the person candidate determination unit 164 as the first person candidates, by means of image processing (S304). The reverse measuring unit 168 measures the number of times of reverses and, in pararell, the reverse cycle when the person candidate determination unit 164 determines that the block group 210 tracked by the person candidate tracking unit 166 is the first person candidate, and is not the first person candidate (S306). Subsequently, on the basis of the result of the reverse measuring unit 168, the person candidate specifying unit 170 specifies the second person candidate, or determines whether or not the first person candidate is moving or not (S308). Hereinafter, the above processing will be explained more specifically.

(Position Information Obtaining Processing S300)

Figure 11:
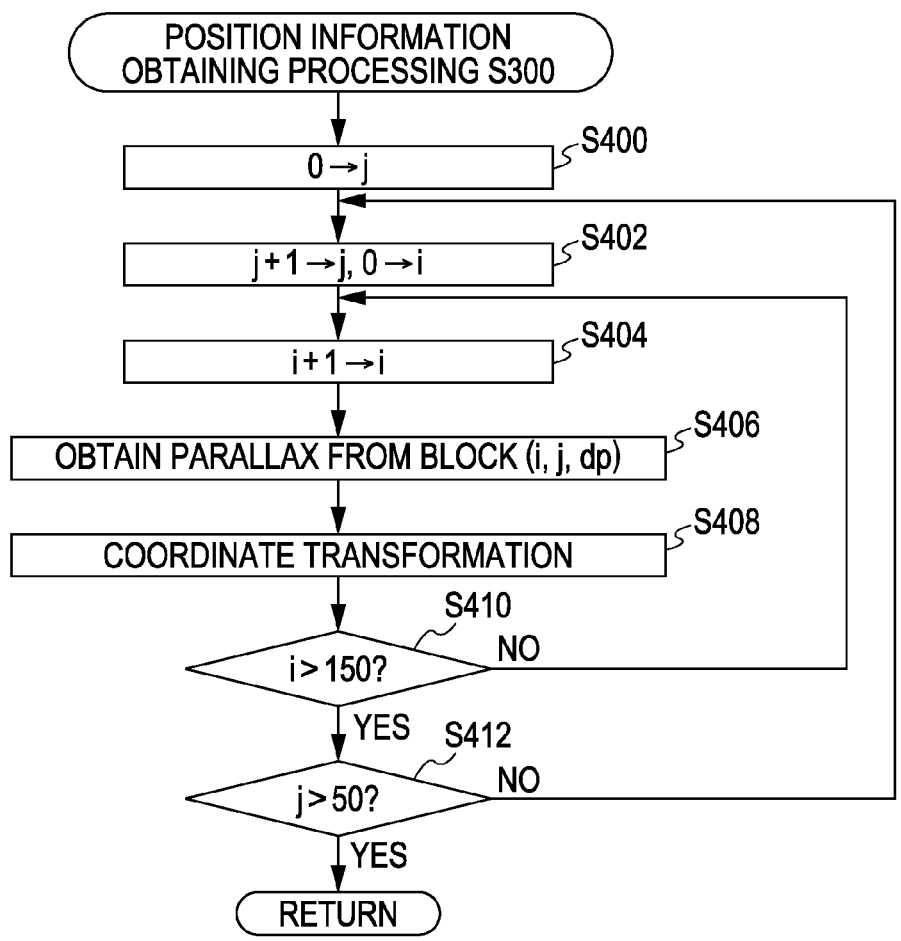
FIG. 11 is a flowchart illustrating a flow of position information obtaining processing.

As shown in FIG. 11, the position information obtaining unit 160 initializes a vertical variable j for identifying a block (substitutes "0" thereinto) (S400). Subsequently, the position information obtaining unit 160 adds "1" to the vertical variable j, and initializes the horizontal variable i (substitutes "0" thereinto) (S402). Subsequently, the position information obtaining unit 160 adds "1" to the horizontal variable i (S404).

The position information obtaining unit 160 obtains parallax information dp from the block (i, j, dp) of the distance image 126 (S406). Then, the position information obtaining unit 160 uses the above numerical expressions 1 to 3 to transform the coordinate of the block (i, j, dp) including the parallax information dp into the coordinate of the point (x, y, z) in the real world, thereby making the block (i, j, dp, x, y, z) (S408).

Subsequently, the position information obtaining unit 160 determines whether or not the horizontal variable i is more than 150, i.e., the maximum value of horizontal block (S410), and when the horizontal variable i is determined not to be more than the maximum value (NO in S410), the processing is repeated from the increment processing of the horizontal variable i in step S404. When the horizontal variable i is determined to be more than the maximum value (YES in S410), the position information obtaining unit 160 determines whether or not the vertical variable j is more than 50, i.e., the maximum value of vertical block (S412). Then, when the vertical variable j is determined not to be more than the maximum value (NO in S412), the processing is repeated from the increment processing of the vertical variable j in step S402. When the vertical variable j is determined to be more than the maximum value (YES in S412), the position information acquisition processing S300 is terminated. As described above, the parallax information dp of the distance image 126 is transformed into the three-dimensional position information.

(Grouping/Person Candidate Determining Processing S302)

Figure 12:
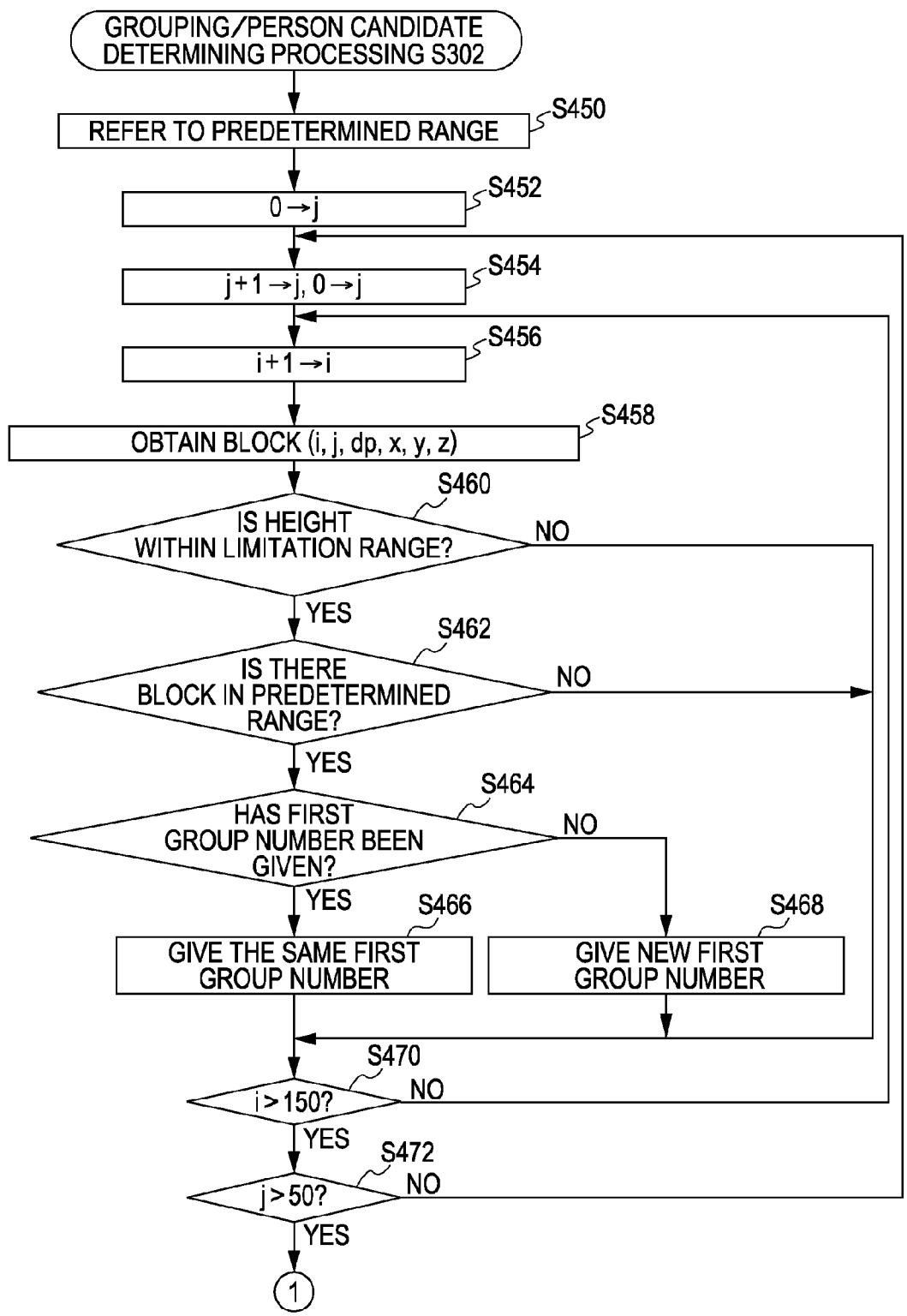
FIG. 12 is a flowchart illustrating a flow of grouping/person candidate determining processing.

As shown in FIG. 12, the grouping unit 162 refers to a predetermined range (for example, 0.5 m) for grouping blocks (S450), and initializes a vertical variable j for specifying a block (substitutes "0" thereinto) (S452). Subsequently, the grouping unit 162 adds "1" to the vertical variable j, and initializes (substitutes "0" to) the horizontal variable i (S454). Then, the grouping unit 162 adds "1" to the horizontal variable i (S456).

The grouping unit 162 obtains a block (i, j, dp, x, y, z) from the distance image 126 (S458). Then, a determination is made as to whether the height y of the block (i, j, dp, x, y, z) is included in a limitation range, i.e., a range extending from the plane corresponding to the road surface to the predetermined height (for example, 1.0 m) (S460). In this case, when the height y is determined to be within the limitation range (YES in S460), the grouping unit 162 determines, on the basis of a coordinate (x, y, z) in the real world corresponding to the block (i, j, dp, x, y, z), whether there is another block (i, j, dp, x, y, z) which is within the predetermined range and which is in the limitation range (S462).

When there is another block existing (YES in S462), the grouping unit 162 determines whether or not a first group number g is attached to any one of all the blocks in the predetermined range including the block under determination (S464). When the first group number g is given to any of them (YES in S464), the grouping unit 162 assigns a value to all of the blocks included in within the predetermined range and all of the blocks to which the same first group number g is given, the value being a smaller one of the smallest first group number g among the first group numbers given thereto or the smallest value of numbers that have not yet used as a first group number so as to expressed as a block (i, j, p, dp, x, y, z, g) (S466). When the first group number g is given to none of them (NO in S464), the smallest value of numbers that have not yet used as a first group number is newly assigned to all the blocks within the predetermined range including the block under determination (S468).

In this manner, when there is a plurality of blocks within the predetermined range, grouping process is performed by assigning a first group number g. At this occasion, if the first group number g is determined to be given to none of the plurality of blocks, a new first group number g is assigned, and if the first group number g is determined to already be given to any one of them, the same first group number g is assigned to the other blocks. However, when there is a plurality of first group numbers g in the plurality of blocks, the first group numbers g of all the blocks are replaced with one first group number g so as to treat the blocks as one group.

In the above description, the first group numbers g of not only all the blocks included within the predetermined range but also all the blocks to which the same first group number g is given are changed at a time. The primary reason for this is to avoid dividing the group already unified by changing of the first group numbers g. In addition, a smaller one of the smallest first group number g or the smallest value of numbers that have not yet used as a first group number is employed in order to avoid making a skipped number as much as possible upon group numbering. In so doing, the maximum value of the first group number g does not become unnecessarily large, and the processing load can be reduced.

Back to FIG. 12, when the height y is out of the limitation range (NO in S460), or when no other block exists in the predetermined range (NO in S462), processing in subsequent step S470 is performed.

Subsequently, the grouping unit 162 determines whether or not the horizontal variable i is more than 150 which is the maximum value of pixel number in the horizontal direction (S470). When the horizontal variable i is determined to be not more than the maximum value (NO in S470), the processings are repeated from the increment processing of the horizontal variable i in step S456. When the horizontal variable i is determined to be more than the maximum value (YES in S470), the grouping unit 162 determines whether or not the vertical variable j is more than 50 which is the maximum value of pixel number in the vertical direction (S472). When the vertical variable j is determined not to be more than the maximum value (NO in S472), the processings are repeated from the increment processing of the vertical variable j in step S454. When the vertical variable j is determined to be more than the maximum value (YES in S472), subsequent step is performed.

Figure 13:
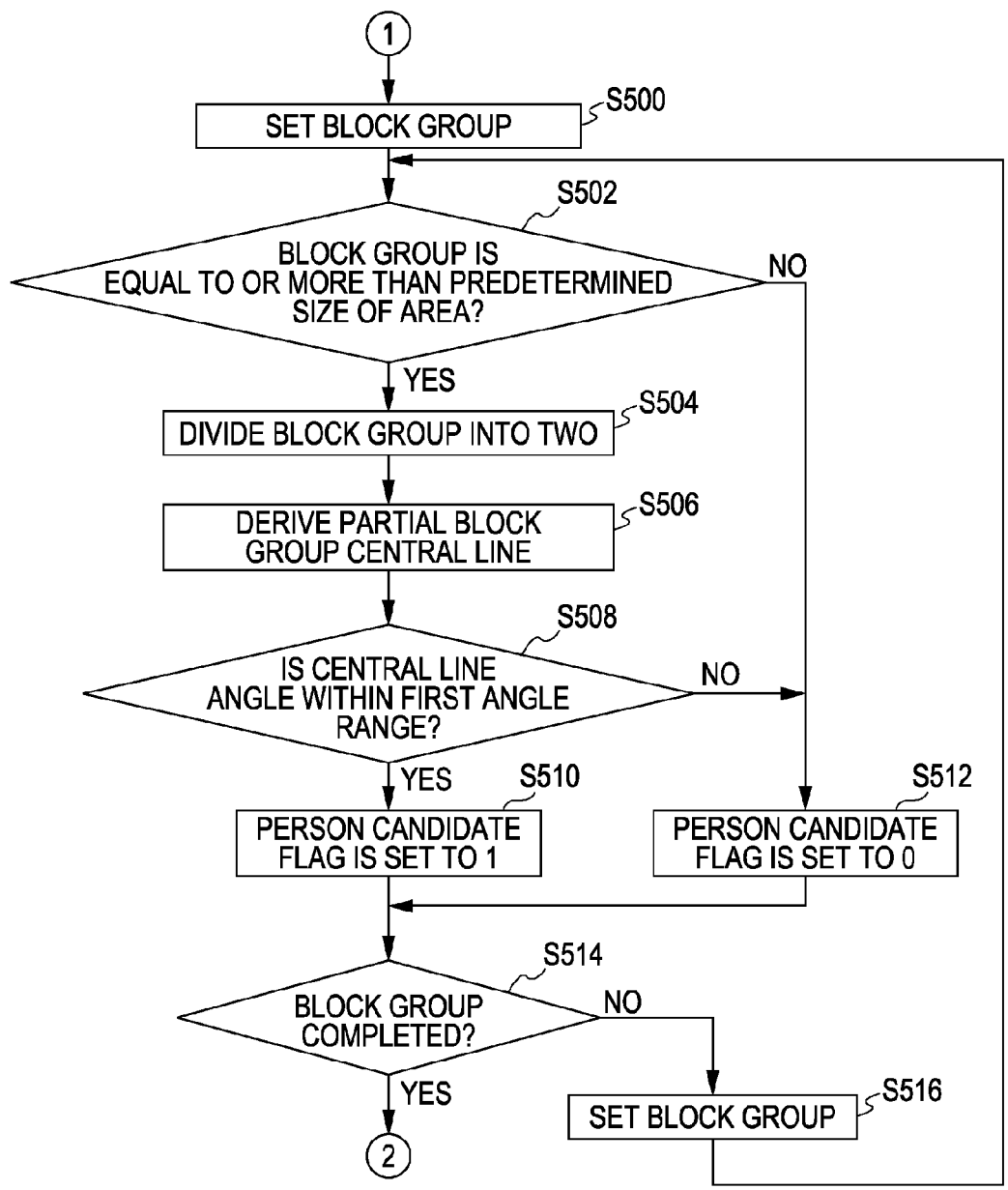
FIG. 13 is a flowchart illustrating a flow of grouping/person candidate determining processing.

As shown in FIG. 13, the person candidate determination unit 164 refers to the smallest first group number g, and sets the block group attached with the first group number g (all the blocks attached with the first group number g) (S500). Subsequently, the person candidate determination unit 164 determines whether or not the size of area of the block group thus set is equal to or more than a predetermined size of area that can be considered to be legs of a person (S502). When the condition is satisfied here (YES in S502), the block group is divided into two in the horizontal direction of the image (S504), and the central line of each of the two divided partial block groups is derived (S506).

Subsequently, the person candidate determination unit 164 determines whether or not the central line angle of the central line of each of the two divided block groups is included in the predetermined first angle range (for example, within 30±15 degrees) (S508). When the central line angle is included in the first angle range (YES in S508), the block group in question is temporality determined to be the first person candidate, and a person candidate flag f="1" is given to the blocks (S510). The first angle range may be changed according to the distance between the subject vehicle 1 and the block group.

When the size of area of the block group does not satisfy the condition (NO in S502), or when the central line angle is not included in the first angle range (NO in S508), the person candidate determination unit 164 gives a person candidate flag f="0" to the blocks (S512), and processing in subsequent step S514 is performed.

Then, the person candidate determination unit 164 determines whether processing in step S502 to step S512 is carried out on all of the multiple block groups (S514). When processing in step S502 to step S512 is determined not to have been carried out on all the block groups (NO in S514), the first group number g is updated and a new block group is set (S516), and then processing in step S502 and subsequent steps are repeated for the new block group. On the other hand, when processing in step S502 to step S512 is determined to have been carried out on all the block groups (YES in S514), a subsequent step is performed.

Figure 14:
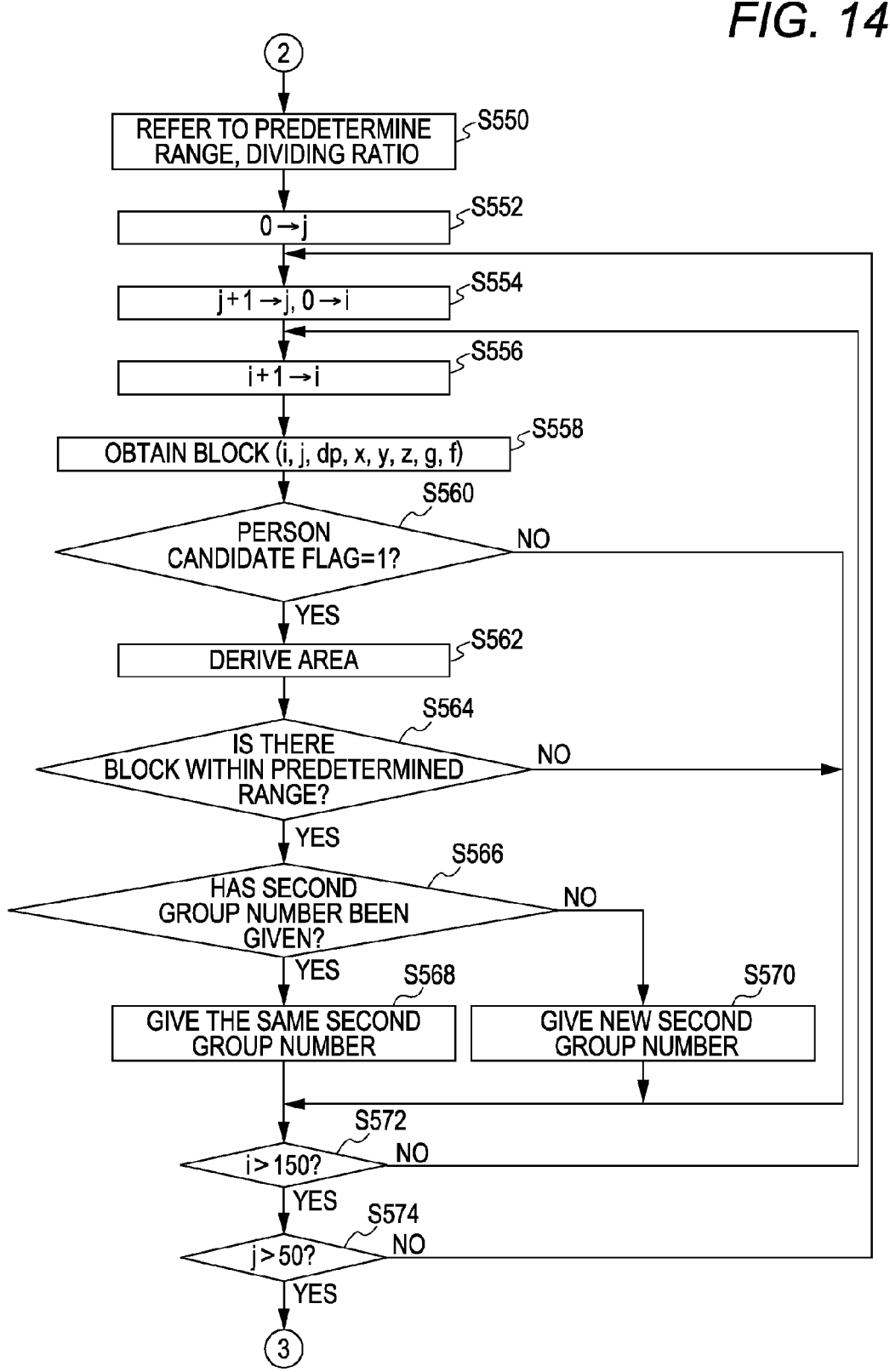
FIG. 14 is a flowchart illustrating a flow of grouping/person candidate determining processing.

As shown in FIG. 14, the grouping unit 162 refers to the predetermined range for grouping the blocks (for example, 0.5 m) and the dividing ratios of multiple areas for dividing in the height direction (S550), and initializes the vertical variable j for specifying the blocks (substitutes "0" thereinto) (S552). Subsequently, the grouping unit 162 adds "1" to the vertical variable j, and initializes the horizontal variable i (substitutes "0" thereinto) (S554). Subsequently, the grouping unit 162 adds "1" to the horizontal variable i (S556).

The grouping unit 162 obtains the block (i, j, dp, x, y, z, g, f) from the distance image 126 (S558). Then, a determination is made as to whether or not the person candidate flag f of the block (i, j, dp, x, y, z, g, f) is "1" (S560). In this case, when the person candidate flag f is determined to be "1" (YES in S560), the grouping unit 162 refers to the dividing ratios, and derives which area of the multiple areas divided in the height direction the block (i, j, dp, x, y, z, g, f) belongs to, and obtains the height range of the area (S562).

Subsequently, the grouping unit 162 determines, on the basis of a coordinate (x, y, z) in the real world corresponding to the block (i, j, dp, x, y, z), whether there is another block (i, j, dp, x, y, z, g, f) which is within the predetermined range and of which height y is included in the height range (S564).

When there is another block (i, j, dp, x, y, z, g, f) existing (YES in S564), the grouping unit 162 determines whether or not a second group number gg is attached to any one of all the blocks in the predetermined range including the block under determination (S566). When the second group number gg is given to any of them (YES in S566), the grouping unit 162 assigns a value to all of the blocks included in within the predetermined range and all of the blocks to which the same second group number gg is given, the value being a smaller one of the smallest second group number gg among the second group numbers given thereto or the smallest value of numbers that have not yet used as a second group number so as to expressed as a block (i, j, dp, x, y, z, g, f, gg) (S568). When the second group number gg is given to none of them (NO in S566), the smallest value of numbers that have not yet used as a second group number is newly assigned to all the blocks within the predetermined range including the block under determination (S570).

In this manner, like the first group number g, when there is a plurality of blocks within the predetermined range, grouping process is performed by assigning a second group number gg. At this occasion, if the second group number gg is determined to be given to none of the plurality of blocks, a new second group number gg is assigned, and if the second group number gg is determined to already be given to any one of them, the same second group number gg is assigned to the other blocks. However, when there is a plurality of second group numbers gg in the plurality of blocks, the second group numbers gg of all the blocks are replaced with one second group number gg so as to treat the blocks as one group.

When the person candidate flag f is not "1" (NO in S560), or when there is no other block in the predetermined range (NO in S564), processing in subsequent step S572 is performed.

Subsequently, the grouping unit 162 determines whether or not the horizontal variable i is more than 150 which is the maximum value of pixel number in the horizontal direction (S572). When the horizontal variable i is determined to be not more than the maximum value (NO in S572), the processings are repeated from the increment processing of the horizontal variable i in step S556. When the horizontal variable i is determined to be more than the maximum value (YES in S572), the grouping unit 162 determines whether or not the vertical variable j is more than 50 which is the maximum value of pixel number in the vertical direction (S574). Then, when the vertical variable j is determined not to be more than the maximum value (NO in S574), the processing is repeated from the increment processing of the vertical variable j in step S554. When the vertical variable j is determined to be more than the maximum value (YES in S574), subsequent step is performed.

Figure 15:
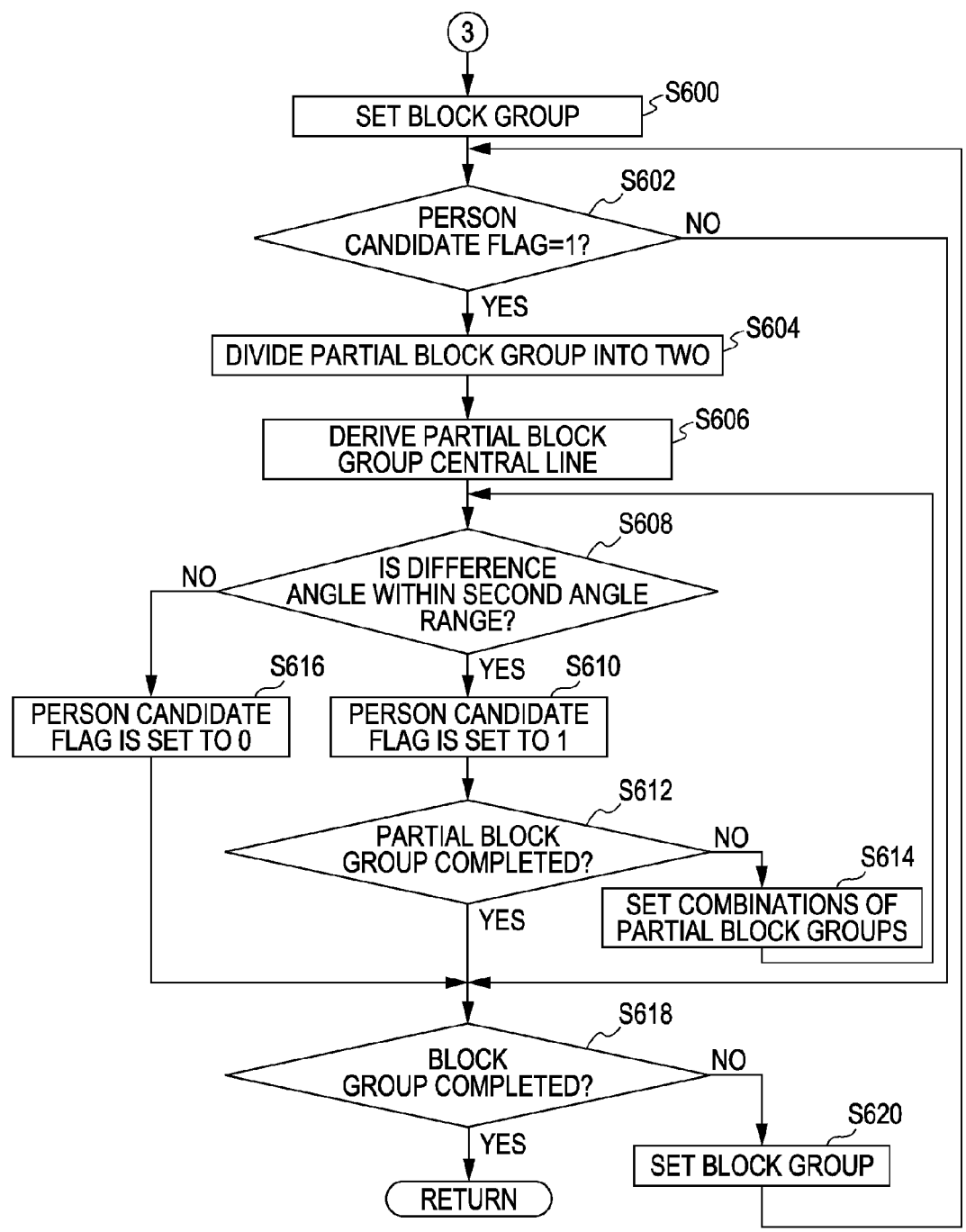
FIG. 15 is a flowchart illustrating a flow of grouping/person candidate determining processing.

As shown in FIG. 15, the person candidate determination unit 164 refers to the smallest first group number g, and sets the block group attached with the first group number g (S600). Subsequently, the person candidate determination unit 164 determines whether the person candidate flag f of the block (i, j, dp, x, y, z, g, f, gg) in the block group is "1" or not (S602). At this occasion, when the person candidate flag f is determined to be "1" (YES in S602), all the partial block groups which belong to the block group having been set (partial block groups of which first group numbers g are the same but of which second group numbers gg are different) are called, and divided in the horizontal direction of the image (S604). Then, the person candidate determination unit 164 derives all the central lines of the two divided partial block groups (S606).

Subsequently, the person candidate determination unit 164 extracts combinations of partial block groups adjacent to each other in the height direction from multiple partial block groups (six partial block groups in this case), and determines whether difference angles formed by the central lines of the combinations of the extracted partial block groups are included in the predetermined second angle range (for example, the absolute value is 5 degrees or more) (S608). When the difference angle is determined to be included in the second angle range (YES in S608), the block group in question is determined to be the first person candidate, and the person candidate flag f="1" is maintained in the blocks (S610).

Then, the person candidate determination unit 164 determines whether the processing in steps S608, S610 has been performed on all the combinations of the partial block groups (S612). At this occasion, when all the combinations of the partial block groups are determined not to have been finished (NO in S612), the second group number gg is updated and new combinations of partial block groups adjacent to each other are set (S614), and processing of step S608 and subsequent steps are repeated on the new combinations of partial block groups. On the other hand, when all the combinations of the partial block groups are determined to have been finished (YES in S612), step S618 is subsequently performed.

When the difference angle is determined not to be included in the second angle range (NO in S608), the person candidate determination unit 164 replaces the person candidate flag f of the blocks with "0" (S616), and stops the processing concerning the block group, and then processing in step S618 is subsequently performed. When the person candidate flag f is determined to not to be "1" (NO in S602), processing in step S618 is also performed.

The person candidate determination unit 164 determines whether processing in step S602 to step S616 is carried out on all of the multiple block groups (S618). When processing in step S602 to step S616 is determined not to have been carried out on all the block groups (NO in S618), the first group number g is updated and a new block group is set (S620), and then processing in step S602 and subsequent steps are repeated for the new block group. On the other hand, when processing in step S602 to step S616 is determined to have been carried out on all the block groups (YES in S618), the grouping/person candidate determining processing S302 is terminated. In this manner, the first person candidate which is to be recognized as a person can be extracted with a high degree of accuracy.

(Person Candidate Tracking Processing S304)

Figure 16:
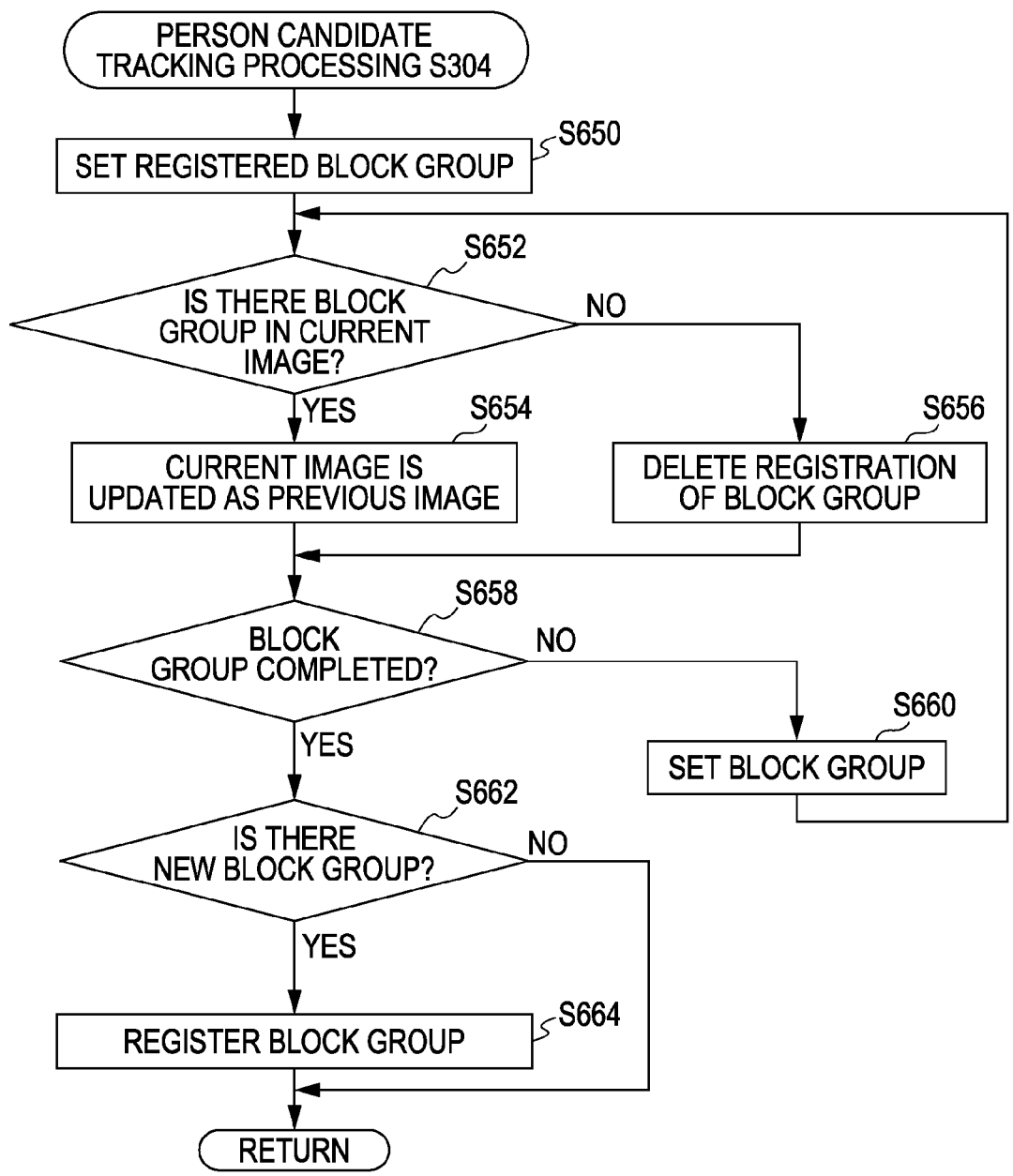
FIG. 16 is a flowchart illustrating a flow of person candidate tracking processing.

As shown in FIG. 16, the person candidate tracking unit 166 sets a registered block group (S650), and determines whether or not there is any block group of which tendency of luminance is similar to the luminance of the previous image in the block group, at a position and proximity thereto in the current image corresponding to the previous position of the block group having been set (S652). When there is a block group satisfying the condition (YES in S652), the block group of the current image is updated as the previous image in order to continue tracking the block group (S654). When there is no block group satisfying the condition (NO in S652), the tracking of the block group has failed, and the registration of the tracked block group is deleted (S656).

Subsequently, the person candidate tracking unit 166 determines whether the processing in step S652 to step S656 has been carried out on all the registered multiple block groups (S658). At this occasion, when the processing in step S652 to step S656 is determined not to have been carried out on all the registered block groups (NO in S658), a new registered block group is set (S660), and step S652 and subsequent steps are repeated for the new block group. On the other hand, when processing in step S652 to step S656 is determined to have been carried out on all the block groups (YES in S658), the processing in step S662 is performed.

Subsequently, the person candidate tracking unit 166 determines whether or not there is any block group newly determined to be the first person candidate by the person candidate determination unit 164 (S662). When the person candidate tracking unit 166 determines that there is such block group (YES in S662), the block group is newly registered as a tracking target (S664). At this occasion, the following variables are set, in association the block group, as variables used in the reverse measuring processing S306 in a later stage: the number of times of reverses N="1", and the reverse flag="1". A reverse time counter dedicated for that block group is provided and reset to zero. In this case, the reverse time counter is means for measuring a time from the reset. Then, the person candidate tracking processing S304 is terminated. In this manner, the block group that is determined to be the first person candidate even once can be tracked while it exists in the image regardless of movement of the block group.

(Reverse Measuring Processing S306)

Figure 17:
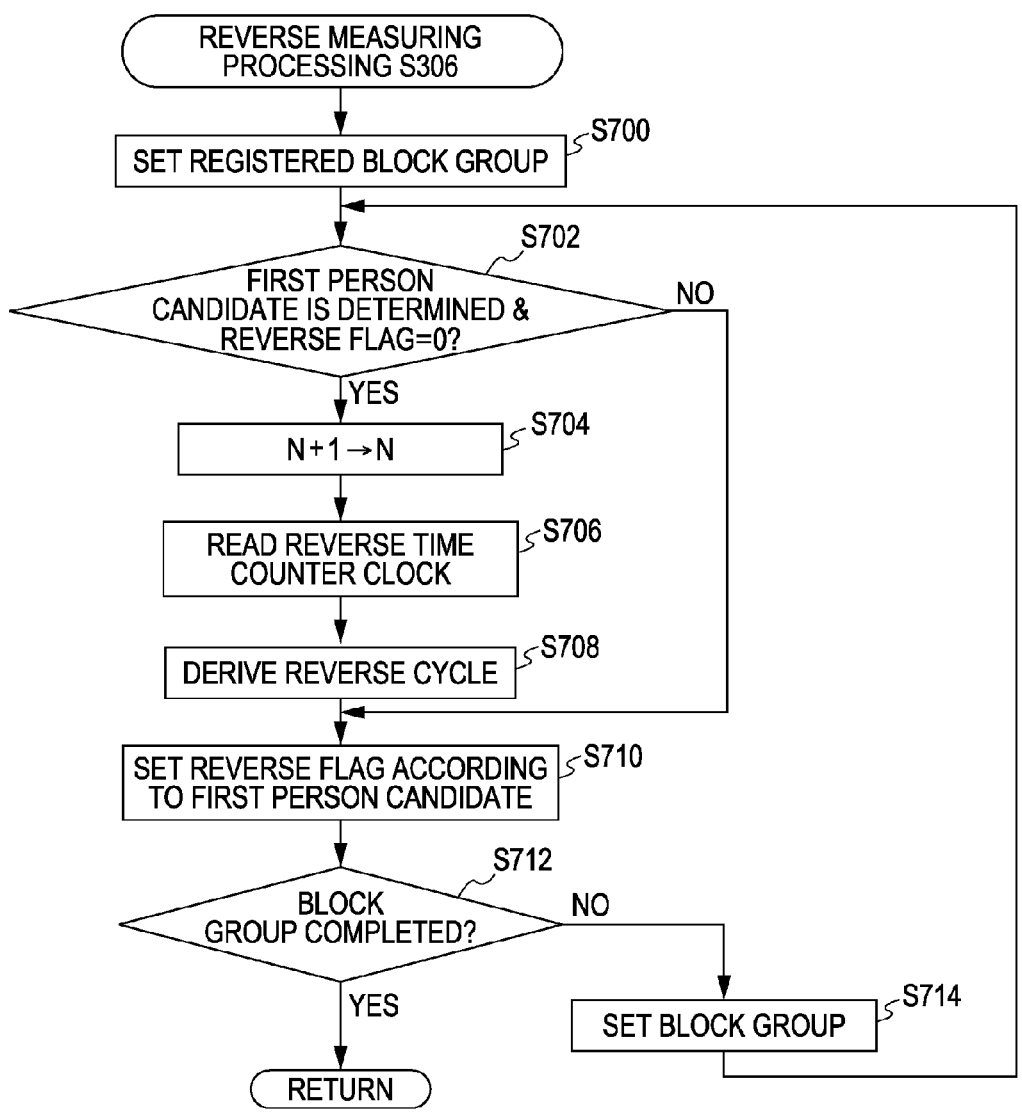
FIG. 17 is a flowchart illustrating a flow of reverse measuring processing.

As shown in FIG. 17, the reverse measuring unit 168 sets a registered block group (S700), and determines whether or not that block group is determined to be the first person candidate by the person candidate determination unit 164 and whether or not the reverse flag is zero (S702). This indicates a reverse from a state in which it is determined not to be the first person candidate to a state in which it is determined to be the first person candidate.

The person candidate determination unit 164 determines that the block group is the first person candidate and that the reverse flag is zero (YES in S702), the reverse measuring unit 168 increments the number of times of reverses N by one (S704), and reads the time from the reverse time counter (S706). Then, the reverse measuring unit 168 adopts a reciprocal number of the time read from the reverse time counter as a reverse cycle, and resets the reverse time counter (S708). In this manner, upon a reverse from a state in which it is determined not to be the first person candidate by the person candidate determination unit 164 to a state in which it is determined to be the first person candidate by the person candidate determination unit 164, the number of times of reverses and the reverse cycle can be derived. In this case, the reverse cycle is derived on the basis of one reverse. Alternatively, an average value may be derived based on multiple reverses.

Subsequently, the reverse measuring unit 168 sets the reverse flag so that the reverse flag reflects the result indicating whether or not the person candidate determination unit 164 determines that the block group is the first person candidate (S710). More specifically, when the person candidate determination unit 164 determines that the block group is the first person candidate, the reverse measuring unit 168 sets the reverse flag to "1". When the person candidate determination unit 164 determines that the block group is not the first person candidate, the reverse measuring unit 168 sets the reverse flag to "0". In subsequent reverse measuring processing S306, the reverse flag is used as a previous value indicating whether the block group is determined to be the first person candidate.

Subsequently, the reverse measuring unit 168 determines whether or not processing in step S702 to step S710 has been carried out on all the registered multiple block groups (S712). At this occasion, when the processing in step S702 to step S710 is determined not to have been carried out on all the registered block groups (NO in S712), a new registered block group is set (S714), and step S702 and subsequent steps are repeated for the new block group. On the other hand, when the processing in step S702 to step S710 is determined to have been carried out on all the registered block groups (YES in S712), the reverse measuring processing S306 is terminated.

(Person Candidate Specifying Processing S308)

Figure 18:
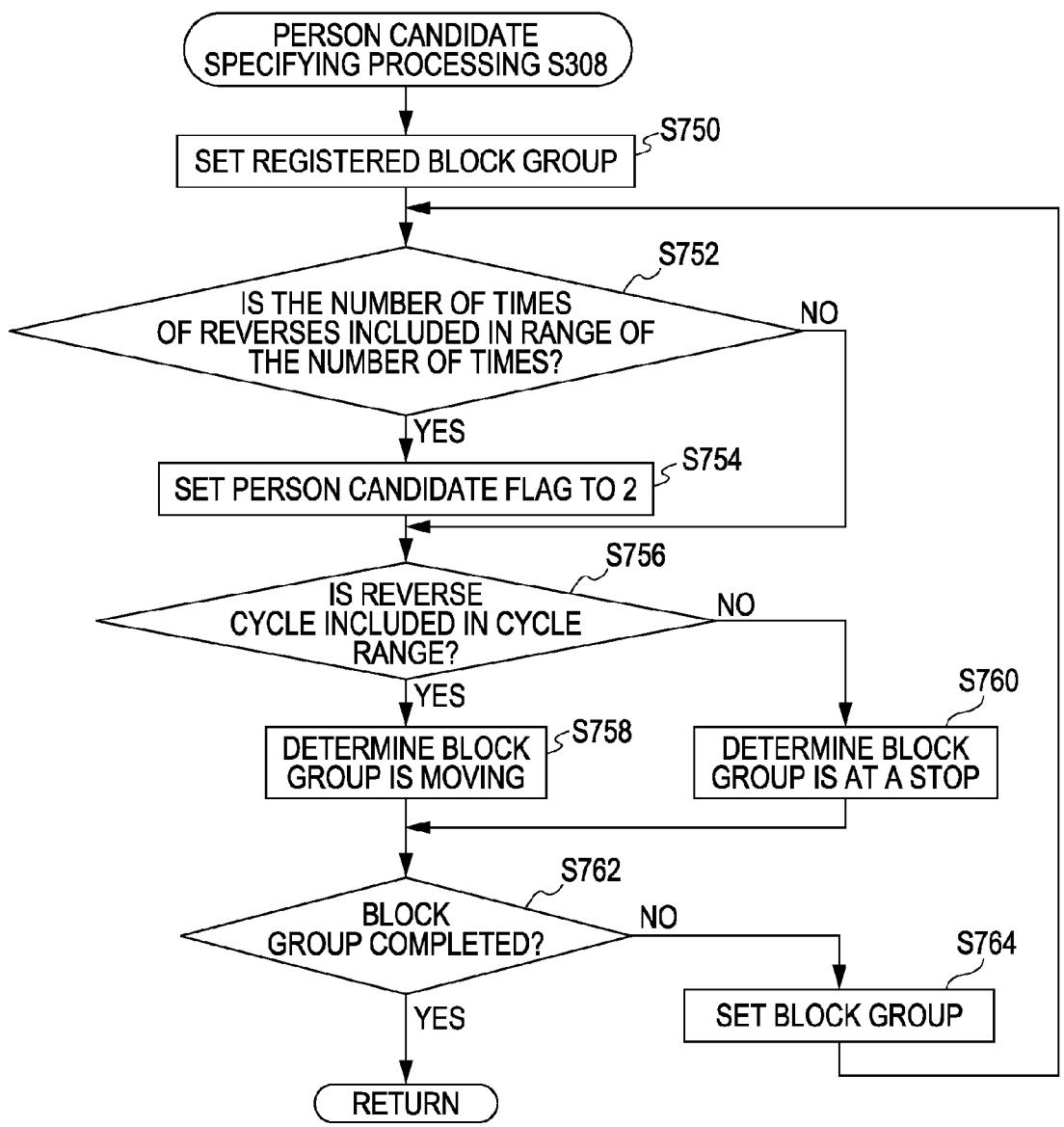
FIG. 18 is a flowchart illustrating a flow of person candidate specifying processing.

As shown in FIG. 18, the person candidate specifying unit 170 sets a registered block group (S750), and determines whether or not the number of times of reverses of that block group is included in a predetermined range of the number of times (for example, four times or more) (S752). When the number of times of reverses is determined to be included in the range of the number of times (YES in S752), the person candidate flags f of all the blocks forming the block group (i, j, dp, x, y, z, g, f, gg) are changed from "1" to "2" (S754). In this manner, the block group can be specified as the second person candidate of which likelihood of being a person is higher than the first person candidate.

Subsequently, the person candidate specifying unit 170 determines whether or not the reverse cycle is included within the predetermined cycle range (for example, 0.5 Hz or more) (S756). When the reverse cycle is determined to be included in the cycle range (YES in S756), the person candidate specifying unit 170 determines that the block group in question is moving (S758). When the reverse cycle is determined not to be included in the cycle range (NO in S756), the person candidate specifying unit 170 determines that the block group is at a stop (S760).

Subsequently, the person candidate specifying unit 170 determines whether or not processing in step S752 to step S760 has been carried out on all the registered multiple block groups (S762). At this occasion, when the processing in step S752 to step S760 is determined not to have been carried out on all the registered block groups (NO in S762), a new registered block group is set (S764), and step S752 and subsequent steps are repeated for the new block group. On the other hand, when the processing in step S752 to step S760 is determined to have been carried out on all the block groups (YES in S762), the person candidate specifying processing S308 is terminated. In this manner, the second person candidate can be extracted, and a determination can be made as to whether the block group is moving.

As described above, according to the exterior environment recognition device 130 and the exterior environment recognition method, the efficiency for specifying a person and the accuracy for specifying a person can be improved by directly specifying the person with a lower portion area (the lower half of the body) of the person.

In addition, a program for allowing a computer to function as the exterior environment recognition device 130 is also provided as well as a storage medium such as a computer-readable flexible disk, a magneto-optical disk, a ROM, a CD, a DVD, a BD storing the program. Here, the program means a data processing function described in any language or description method.

(Modifications)

In the above embodiment, relative position relationship is used as the first relative relationship between blocks which is used by the grouping unit 162 for the grouping process. However, the first relative relationship is not limited to such case. For example, a difference of luminances and continuity in edge direction may also be used. Hereinafter, the difference of luminances and the continuity in edge direction will be briefly explained.

(Difference of Luminances)

The grouping unit 162 can use the luminance image 124 instead of the distance image 126 to group multiple blocks in the luminance image 124 on the basis of difference of luminances, thus generating block groups serving as portion groups. For example, the grouping unit 162 performs grouping process in such a manner that any given block is adopted as a base point, and a block adjacent to that block is retrieved, and a difference of luminances of the two blocks is derived, and a block of which difference of luminances is within a predetermined range (for example, difference of each of RGB is within ⅒ of the full scale) is considered to correspond to same target object.

(Continuity in Edge Direction)

FIGS. 19A-19G are explanatory diagrams for explaining continuity in edge direction. Among them, FIG. 19A shows a simplified video image of the lower half of the body of a person 208 in the luminance image 124 taken at night. A luminance distribution as shown in FIG. 19B is obtained by enlarging any given block 240a in FIG. 19A. A luminance distribution as shown in FIG. 19C is obtained by enlarging another block 240b. The range of luminance range is 0 to 255. In FIG. 19B, suppose that filling in white is denoted as luminance "200", and filling in black is denoted as luminance "0". In this case, in the figure of the block, suppose that the luminance of the upper left pixel is defined as A, the luminance of the upper left pixel is defined as B, the luminance of the lower left pixel is defined as C, the luminance of the lower right pixel is defined as D, the horizontal direction component in the edge direction is defined as (A+B)−(C+D), and the vertical direction component in the edge direction is defined as (A+C)−(B+D).

Accordingly, the horizontal direction component in the edge direction of the block 240a as shown in FIG. 19B is (A+B)−(C+D)=(200+0)−(200+0)=0, and the vertical direction component in the edge direction thereof is (A+C)−(B+D)=(200+200)−(0+0)=+400. Therefore, the horizontal direction component is "0", and the vertical direction component is "+400". The edge direction is denoted as an upward arrow in the vertical direction as shown in FIG. 19D. However, as shown in FIG. 19F, the horizontal component is positive in the right direction, whereas the vertical component is positive in the upper direction.

Likewise, the horizontal direction component in the edge direction of the block 240a as shown in FIG. 19C is (A+B)−(C+D)=(0+0)−(200+200)=−400, and the vertical direction component in the edge direction thereof is (A+C)−(B+D)=(0+200)−(0+200)=0. Therefore, the horizontal direction component is "−400", and the vertical direction component is "0". The edge direction is denoted as a left arrow in the horizontal direction as shown in FIG. 19E.

As described above, half of the area in the block is subtracted from the other half in the block, and this configuration allows reduction of noises and offset of the luminance included in the entire block, thus enabling appropriate extraction of the edge. In addition, since the edge direction can be derived using simple calculation of only addition and subtraction, the load of computation is low.

The continuity in the edge direction is to determine the sameness of blocks adjacent to each other in the edge direction thus derived and associating the blocks with each other. In this modification, both of the horizontal direction component and the vertical direction component are defined by a unit length, and this simplifies variation in the edge direction. More specifically, both of the horizontal direction component and the vertical direction component are deemed as either −1, 0, or +1. In this case, as shown in FIG. 19G, the edge direction can be limited to nine states including eight directions each different by 45 degrees and nil-direction in which both of the horizontal direction component and the vertical direction component are zero. By doing this, the load of computation by the grouping unit 162 can be greatly reduced.

In this modification, the grouping unit 162 derives the edge direction for each block of the image in which the lower half of the body of the person is displayed, and associates blocks adjacent to each other of which edge directions are the same, thus generating a continuous edge trace. In this manner, the shape of the lower half of the body of the person can be specified just like the difference of the luminance and the relative position relationship.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the above embodiment, angle formed by the vertical line and the central line of each of the two divided groups (central line angle) is used as the second relative relationship for determining the first person candidate. However, the embodiment is not limited thereto. One or more relationships selected from the group including the shape, the size of area, the symmetry, and the luminance may be used. For example, the first person candidate is determined when the similarity in shape or a difference in the size of area is within a predetermined range, when there is a high degree of symmetry in the horizontal direction, or when the distribution of the luminance or a difference of the total amount is within a predetermined range.

In the above embodiment, the three-dimensional position of the target object is derived based on the parallax between image data using the plurality of imaging devices 110. However, the present invention is not limited to such case. Alternatively, for example, a variety of known distance measuring devices such as a laser radar distance measuring device may be used. In this case, the laser radar distance measuring device emits laser beam to the detection area 122, receives the light reflected when the laser beam is shone upon the object, and measures the distance to the object based on this required time.

In the above embodiment, for example, the position information obtaining unit 160 receives the distance image (parallax information) 126 from the image processing device 120, and generates the three-dimensional position information. However, the present invention is not limited to such case. The image processing device 120 may generate the three-dimensional position information in advance, and the position information obtaining unit 160 may obtain the generated three-dimensional position information. Such a functional distribution can reduce the processing load of the exterior environment recognition device 130.

In the above embodiment, the position information obtaining unit 160, the grouping unit 162, the person candidate determination unit 164, the person candidate tracking unit 166, the reverse measuring unit 168, the person candidate specifying unit 170 are configured to operate with software by the central control unit 156. However, the functional units may be configured with hardware.

The steps of the environment recognition method in this specification do not necessarily need to be processed chronologically according to the order described in the flowchart. The steps may be processed in parallel, or may include processings using subroutines.

The present invention can be used for the exterior environment recognition device and the exterior environment recognition method that recognize environment outside of the subject vehicle.

The invention claimed is:

1. An exterior environment recognition device comprising semiconductor circuitry configured to:
   obtain an image in a detection area;
   generate a portion group by grouping, based on a first relative relationship between or among portions, multiple portions in an area extending from a plane corresponding to a road surface to a predetermined height in the obtained image; and
   divide the portion group into two in a horizontal direction of the image, and determines, based on a second relative relationship between two divided portion groups, whether the portion group is a first person candidate which is a candidate of a person, wherein
   the second relative relationship is whether or not each central line angle formed by a vertical line and a central line of each of the two divided portion groups is included in a predetermined first angle range.

2. The exterior environment recognition device according to claim 1, wherein the first relative relationship is any one of a relative position relationship, a difference of luminance, or continuity in an edge direction.

3. The exterior environment recognition device according to claim 1, wherein the second relative relationship is one or more relationships selected from a group including a shape, a size of area, symmetry, and luminance.

4. The exterior environment recognition device according to claim 1, wherein the semiconductor circuitry is further configured to:
   divide, into multiple areas in a height direction, the area extending from the plane corresponding to the road surface to the predetermined height in the image, and groups multiple portions in each of the areas divided; and
   determine the first person candidate when the second relative relationship between the two divided portion groups is satisfied and a difference angle between central lines of the grouped portion groups adjacent to each other in the height direction is equal to or more than a predetermined second angle range.

5. The exterior environment recognition device according to claim 4, wherein when a difference angle formed by any one of the areas in the height direction is determined not to be equal to or more than the predetermined second angle range, the semiconductor circuitry is configured not to execute determination of the first person candidate concerning the remaining areas.

6. The exterior environment recognition device according to claim 1, wherein the semiconductor circuitry is further configured to change the first angle range according to a relative distance between a subject vehicle and the portion group.

7. The exterior environment recognition device according to claim 1, wherein the semiconductor circuitry includes a processor and a memory storing a program for the processor.

8. An exterior environment recognition device comprising semiconductor circuitry configured to:
   obtain an image in a detection area;
   generate a portion group by grouping, based on a first relative relationship between or among portions, multiple portions in an area extending from a plane corresponding to a road surface to a predetermined height in the obtained image; and
   divide the portion group into two in a horizontal direction of the image, and determines, based on a second relative relationship between two divided portion groups, whether the portion group is a first person candidate which is a candidate of a person;
   track the portion group determined to be the first person candidate;
   measure a number of times of reverses when it is determined that the portion group tracked is the first person candidate and has not been the first person candidate; and
   specify the first person candidate as a second person candidate when the number of times of reverses is determined to be equal to or more than the predetermined range of the number of times.

9. An exterior environment recognition device comprising semiconductor circuitry configured to:
   obtain an image in a detection area;
   generate a portion group by grouping, based on a first relative relationship between or among portions, multiple portions in an area extending from a plane corresponding to a road surface to a predetermined height in the obtained image; and
   divide the portion group into two in a horizontal direction of the image, and determines, based on a second relative relationship between two divided portion groups, whether the portion group is a first person candidate which is a candidate of a person;
   track the portion group determined to be the first person candidate;
   measure a reverse cycle when is determined that the portion group tracked is the first person candidate and has not been the first person candidate; and
   determine that the first person candidate is moving when a reverse cycle is determined to be equal to or more than a predetermined cycle range.

* * * * *